US010249085B2

(12) United States Patent
Howson et al.

(10) Patent No.: US 10,249,085 B2
(45) Date of Patent: Apr. 2, 2019

(54) GRAPHICS PROCESSING METHOD AND SYSTEM FOR PROCESSING SUB-PRIMITIVES USING SUB-PRIMITIVE INDICATIONS IN A CONTROL STREAM

(71) Applicant: Imagination Technologies Limited, Kings Langley (GB)

(72) Inventors: John W. Howson, St. Albans (GB); Xile Yang, Rickmansworth (GB); Andrea Sansottera, Sussex (GB); Lorenzo Belli, Hemel Hempstead (GB); Jonathan Redshaw, St. Albans (GB)

(73) Assignee: Imagination Technologies Limited, Kings Langley (GB)

( * ) Notice: Subject to any disclaimer, the term of this patent is extended or adjusted under 35 U.S.C. 154(b) by 121 days.

(21) Appl. No.: 15/259,299

(22) Filed: Sep. 8, 2016

(65) Prior Publication Data

US 2017/0069132 A1    Mar. 9, 2017

(30) Foreign Application Priority Data

Sep. 8, 2015    (GB) .................................. 1515889.2

(51) Int. Cl.
*G06T 1/20*       (2006.01)
*G06T 11/40*     (2006.01)
(Continued)

(52) U.S. Cl.
CPC ............... *G06T 17/20* (2013.01); *G06T 1/20* (2013.01); *G06T 11/40* (2013.01); *G06T 15/005* (2013.01); *G06T 15/40* (2013.01); *G06T 17/205* (2013.01)

(58) Field of Classification Search
None
See application file for complete search history.

(56) References Cited

U.S. PATENT DOCUMENTS

2004/0263520 A1    12/2004    Wasserman et al.
2008/0007560 A1*    1/2008    Howson ................... G06T 1/60
                                                                            345/531
(Continued)

FOREIGN PATENT DOCUMENTS

WO         2009/115778 A1    9/2009
WO         2014/068400 A2    5/2014
WO         WO 2014068400 A2 *    5/2014    ........... G06T 15/005

*Primary Examiner* — Xin Sheng
(74) *Attorney, Agent, or Firm* — Vorys, Sater, Seymour and Pease LLP; Vincent M DeLuca

(57) ABSTRACT

When untransformed display lists are used in a tile-based graphics processing system, the processing involved in deriving sub-primitives may need to be performed in both the geometry processing phase and the rasterization phase. To reduce the duplication of this processing, the control stream data for a tile includes sub-primitive indications to indicate which sub-primitives are to be used for rendering a tile. This allows the sub-primitives to be determined efficiently in the rasterization phase based on this information determined in the geometry processing phase. Furthermore, a hierarchical cache system may be used to store a hierarchy of graphics data items used for deriving sub-primitives. If graphics data items for deriving a sub-primitive are stored in the cache, the retrieval of these graphics data items from the cache in the rasterization phase can reduce the amount of processing performed to derive the sub-primitives.

20 Claims, 13 Drawing Sheets

(51) Int. Cl.
*G06T 15/00* (2011.01)
*G06T 15/40* (2011.01)
*G06T 17/20* (2006.01)

(56) References Cited

U.S. PATENT DOCUMENTS

2011/0267346 A1 11/2011 Howson
2014/0071150 A1 3/2014 Fishwick et al.
2014/0210819 A1 7/2014 Mei et al.

\* cited by examiner

GRAPHICS PROCESSING METHOD AND SYSTEM FOR PROCESSING SUB-PRIMITIVES USING SUB-PRIMITIVE INDICATIONS IN A CONTROL STREAM

BACKGROUND

Graphics processing systems are typically configured to receive graphics data, e.g. from an application running on a computer system, and to render the graphics data to provide a rendering output. For example, the graphics data provided to a graphics processing system may describe geometry within a three dimensional (3D) scene to be rendered, and the rendering output may be a rendered image of the scene. Some graphics processing systems (which may be referred to as "tile-based" graphics processing systems) use a rendering space which is subdivided into a plurality of tiles. The "tiles" are regions of the rendering space, and may have any suitable shape, but are typically rectangular (where the term "rectangular" includes square). As is known in the art, there are many benefits to subdividing the rendering space into tiles. For example, subdividing the rendering space into tiles allows an image to be rendered in a tile-by-tile manner, wherein graphics data for a tile can be temporarily stored "on-chip" during the rendering of the tile, thereby reducing the amount of data transferred between a system memory and a chip on which a graphics processing unit (GPU) of the graphics processing system is implemented.

Tile-based graphics processing systems typically operate in two phases: a geometry processing phase and a rasterisation phase. In the geometry processing phase, the graphics data for a render is analysed to determine, for each of the tiles, which graphics data items are present within that tile. Then in the rasterisation phase, a tile can be rendered by processing those graphics data items which are determined to be present within that tile (without needing to process graphics data items which were determined in the geometry processing phase to not be present within the particular tile).

FIG. 1 shows an example of a tile-based graphics processing system 100. The system 100 comprises a memory 102, geometry processing logic 104 and rasterisation logic 106. The geometry processing logic 104 and the rasterisation logic 106 may be implemented on a GPU and may share some processing resources, as is known in the art. The geometry processing logic 104 comprises a geometry fetch unit 108, geometry transform logic 110, a cull/clip unit 112 and a tiling unit 114. The rasterisation logic 106 comprises a parameter fetch unit 116, a hidden surface removal (HSR) unit 118 and a texturing/shading unit 120. The memory 102 may be implemented as one or more physical blocks of memory, and includes a graphics memory 122, a transformed parameter memory 124, a control stream memory 126 and a frame buffer 128.

The geometry processing logic 104 performs the geometry processing phase, in which the geometry fetch unit 108 fetches geometry data from the graphics memory 122 and passes the fetched data to the transform logic 110. The geometry data comprises graphics data items which describe geometry to be rendered. For example, the graphics data items may represent geometric shapes, which describe surfaces of structures in the scene, and which are referred to as "primitives". A common primitive shape is a triangle, but primitives may be other 2D shapes and may be lines or points also. Objects can be composed of one or more such primitives. Objects can be composed of many thousands, or even millions of such primitives. Scenes typically contain many objects. Some of the graphics data items may be control points which describe a patch to be tessellated to generate a plurality of tessellated primitives.

The transform logic 110 transforms the geometry data into the rendering space and may apply lighting/attribute processing as is known in the art. The resulting data is passed to the cull/clip unit 112 which culls and/or clips any geometry which falls outside of a viewing frustum. The resulting transformed geometric data items (e.g. primitives) are provided to the tiling unit 114, and are also provided to the memory 102 for storage in the transformed parameter memory 124. The tiling unit 114 generates control stream data for each of the tiles of the rendering space, wherein the control stream data for a tile includes identifiers of transformed primitives which are to be used for rendering the tile, i.e. transformed primitives which are positioned at least partially within the tile. The control stream data for a tile may be referred to as a "display list" or an "object list" for the tile. The control stream data for the tiles is provided to the memory 102 for storage in the control stream memory 126. Therefore, following the geometry processing phase, the transformed primitives to be rendered are stored in the transformed parameter memory 124 and the control stream data indicating which of the transformed primitives are present in each of the tiles is stored in the control stream memory 126.

In the rasterisation phase, the rasterisation logic 106 renders the primitives in a tile-by-tile manner. The parameter fetch unit 116 receives the control stream data for a tile, and fetches the indicated transformed primitives from the transformed parameter memory 124, as indicated by the control stream data for the tile. The fetched transformed primitives are provided to the hidden surface removal (HSR) unit 118 which removes primitive fragments which are hidden (e.g. hidden by other primitive fragments). Methods of performing hidden surface removal are known in the art. The term "fragment" refers to a sample of a primitive at a sampling point, which is to be processed to render pixels of an image. In some examples, there may be a one to one mapping of fragments to pixels. However, in other examples there may be more fragments than pixels, and this oversampling can allow for higher quality rendering of pixel values, e.g. by facilitating anti-aliasing and other filtering that may be applied to multiple fragments for rendering each of the pixel values. Primitives which are not removed by the HSR unit 118 are provided to the texturing/shading unit 120, which applies texturing and/or shading to primitive fragments. Although it is not shown in FIG. 1, the texturing/shading unit 120 may receive texture data from the memory 102 in order to apply texturing to the primitive fragments, as is known in the art. The texturing/shading unit 120 may apply further processing to the primitive fragments (e.g. alpha blending and other processes), as is known in the art in order to determine rendered pixel values of an image. The rasterisation phase is performed for each of the tiles, such that the whole image can be rendered with pixel values for the whole image being determined. The rendered pixel values are provided to the memory 102 for storage in the frame buffer 128. The rendered image can then be used in any suitable manner, e.g. displayed on a display or stored in memory or transmitted to another device, etc.

The amount of geometry data used to represent scenes tends to increase as the complexity of computer graphics applications (e.g. game applications) increases. This means that in the system of FIG. 1, the amount of transformed geometry data which is provided from the geometry processing logic 104 to the memory 102 and stored in the transformed parameter memory 124 increases. This transfer of data from the geometry processing logic 104 (which is typically implemented "on-chip") to the memory 102 (which is typically implemented "off-chip" as system memory) can be a relatively slow process (compared to other processes involved in rendering the geometry data) and can consume large amounts of the memory 102.

Therefore, as described in UK Patent Number GB2458488, some tile-based graphics processing systems can use "untransformed display lists", such that the control stream data for a tile includes indications to the input geometry data, i.e. the untransformed geometry data rather than the transformed geometry data. This means that the transformed geometry data does not need to be provided from the geometry processing logic to the system memory, or stored in the system memory. These systems implement a transform unit in the rasterisation logic because the geometry data fetched by the rasterisation logic is untransformed, but in some scenarios the benefits of avoiding the delay and memory usage of transferring the transformed primitives to the system memory and storing them in the system memory may outweigh the processing costs of performing a transformation in the rasterisation phase.

FIG. 2 shows an example of a system 200 which uses untransformed display lists, similar to that described in GB2458488. The system 200 is similar to the system 100 shown in FIG. 1, and comprises a memory 202, geometry processing logic 204 and rasterisation logic 206. The geometry processing logic 204 and the rasterisation logic 206 may be implemented on a GPU and may share some processing resources, as is known in the art. The geometry processing logic 204 comprises a geometry data fetch unit 208, geometry transform logic 210, a cull/clip unit 212 and a tiling unit 214. The rasterisation logic 206 comprises a fetch unit 216, rasterisation transform logic 230, a HSR unit 218 and a texturing/shading unit 220. The memory 202 may be implemented as one or more physical blocks of memory, and includes a graphics memory 222, a control stream memory 226 and a frame buffer 228.

The geometry processing logic 204 performs the geometry processing phase, in which the geometry data fetch unit 208 fetches geometry data from the graphics memory 222 and passes the fetched data to the transform logic 210. The fetch unit 208 might fetch only data used to compute position of the graphics data items (e.g. primitives) because other data of the graphics data items (e.g. colour data or texture data to be applied during rendering to the graphics data items, etc.) is not needed by the geometry processing logic 204. This is different to the system 100 in which all of the data for graphics data items is fetched by the fetch unit 108. The transform logic 210 transforms the position data of the graphics data items into the rendering space, and the resulting data is passed to the cull/clip unit 212 which culls and/or clips any graphics data items which fall outside of a viewing frustum. The tiling unit 214 generates control stream data for each of the tiles of the rendering space, wherein the control stream data for a tile includes identifiers of graphics data items which are to be used for rendering the tile, e.g. primitives which, when transformed, are positioned at least partially within the tile. The identifiers in the control stream data identify input graphics data items, i.e. graphics data items stored in the graphics memory 222. This is different to the system 100 shown in FIG. 1 in which the identifiers in the control stream data identify transformed primitives stored in the transformed parameter memory 124. The control stream data for the tiles is provided to the memory 202 for storage in the control stream memory 226.

In the rasterisation phase, the fetch unit 216 of the rasterisation logic 206 receives the control stream data for a tile from the control stream memory 226, and fetches the indicated input graphics data items from the graphics memory 222, as indicated by the control stream data for the tile. The input graphics data items are untransformed. The transform logic 230 transforms the fetched graphics data items into the rendering space. The transformed graphics data items are provided to the HSR unit 218 which performs HSR to remove primitive fragments which are hidden. The texturing and shading unit 220 then performs processing such as texturing and/or shading to primitive fragments which are not removed by the HSR unit 218. The HSR unit 218 and the texturing and shading unit 220 operate in a similar manner to the corresponding units 118 and 120 of the system 100 shown in FIG. 1 and described above. The resulting rendered pixel values are provided to the memory 202 for storage in the frame buffer 228 and can subsequently be used, e.g. displayed on a display or stored in memory or transmitted to another device, etc.

The previous patent GB2458488 describes an optimization for the rasterisation phase in which lighting or attribute processing is deferred until after hidden surface removal has been performed. In this optimization, two transform units are implemented in the rasterisation phase: a first transform unit implemented prior to the HSR unit which transforms only "position data" of primitives (i.e. data for use in computing the position of the primitives), and a second transform unit implemented after the HSR unit which performs lighting or attribute processing for primitives which pass the depth tests of the HSR unit. In this way, non-position attributes of primitives are computed only for primitives which are not culled by the HSR unit.

The previous patent GB2458488 describes a further optimization in which position data for primitives is transformed in the geometry processing phase and then stored in a parameter buffer. The position data for primitives can then be fetched during the rasterisation phase and used by the HSR unit and other processing units. The non-position attribute data for the primitives is fetched from memory and transformed for use by the HSR unit and the other processing units. This optimization avoids the need to re-compute the transformed position data for primitives in the rasterisation phase.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The system 200 described above is well-suited for processing graphics data items, such as primitives, which do not generate sub-primitives as they are rendered. However, the processing of many input graphics data items may result in the generation of multiple sub-primitives. The term "sub-primitive" is used herein to refer to a primitive which is generated by processing input graphics data items. Therefore, sub-primitives are not stored in the graphics memory 222, but are generated (for example during geometry processing phase in geometry processing logic 204) from the input graphics data items stored in the graphics memory 222. For example, if the input graphics data items are control points describing a patch to be tessellated, then the tessellation of the control points can produce many sub-primitives (e.g. two, tens, hundreds or thousands of sub-primitives). Furthermore, other operations such as geometry shading and clipping may be performed on graphics data items to generate sub-primitives. Since the system 200 uses control stream data which includes identifiers of input graphics data items stored in the graphics memory 222, the processing stages implemented to determine sub-primitives from the input graphics data items need to be performed in both the geometry processing phase and the rasterisation phase in system 200 for input graphics data items which are not culled in the geometry processing phase. Therefore some processing is duplicated in relation to the processing stages for generating sub-primitives.

According to embodiments described herein there is provided a graphics processing system configured to use a rendering space which is subdivided into a plurality of tiles, the graphics processing system comprising:
  geometry processing logic comprising:
    geometry transform and sub-primitive logic configured to receive graphics data of input graphics data items, and to determine transformed positions within the rendering space of one or more sub-primitives derived from the input graphics data items; and
    a tiling unit configured to generate, for each of the tiles, control stream data including: (i) identifiers of input graphics data items which are to be used for rendering the tile, and (ii) sub-primitive indications to indicate which of the sub-primitives are to be used for rendering the tile; and
  rasterisation logic configured to generate a rendering output for each of the tiles, the rasterisation logic comprising:
    a fetch unit configured to fetch input graphics data items identified by the identifiers in the control stream data for a particular tile;
    rasterisation transform and sub-primitive derivation logic configured to derive, from the fetched input graphics data items, transformed sub-primitives within the rendering space, wherein the derived sub-primitives are to be used for rendering the particular tile, and wherein the sub-primitives are derived in accordance with the sub-primitive indications in the control stream data for the particular tile; and
    one or more processing units for rendering the transformed graphics data items and/or the derived sub-primitives, to thereby generate a rendering output for the particular tile.

There is also provided a method of generating a rendering output in a graphics processing system configured to use a rendering space which is subdivided into a plurality of tiles, the method comprising a geometry processing phase and a rasterisation phase,
  wherein the geometry processing phase comprises:
    receiving graphics data of input graphics data items;
    determining transformed positions within the rendering space of one or more sub-primitives derived from the input graphics data items; and
    for each of the tiles, generating control stream data including: (i) identifiers of input graphics data items which are to be used for rendering the tile, and (ii) sub-primitive indications to indicate which of the sub-primitives are to be used for rendering the tile; and
  wherein the rasterisation phase comprises, for each of the tiles:
    fetching input graphics data items identified by the identifiers in the control stream data for a particular tile;
    using the fetched input graphics data items to derive transformed sub-primitives within the rendering space, wherein the derived sub-primitives are to be used for rendering the particular tile, and wherein the sub-primitives are derived in accordance with the sub-primitive indications in the control stream data for the particular tile; and
    rendering the derived sub-primitives, to thereby generate a rendering output for the particular tile.

According to further embodiments described herein, there is provided a method of rendering a sub-primitive in a graphics processing system, wherein the sub-primitive is derivable from one or more input graphics data items via a sequence of one or more processing stages, and wherein a cache is configured for storing a hierarchy of graphics data items, said hierarchy including one or more of the input graphics data items and one or more graphics data items representing results of processing stages of the sequence, the method comprising:
  determining whether the sub-primitive is stored in the cache;
  if it is determined that the sub-primitive is stored in the cache, retrieving the sub-primitive from the cache and rendering the retrieved sub-primitive;
  if it is determined that the sub-primitive is not stored in the cache, determining whether one or more graphics data items of a higher level of the hierarchy are stored in the cache, wherein the sub-primitive is derivable from said one or more graphics data items of the higher level of the hierarchy; and
    if it is determined that said one or more graphics data items of the higher level of the hierarchy are stored in the cache:
      retrieving the one or more graphics data items of the higher level of the hierarchy from the cache;
      deriving the sub-primitive using the retrieved one or more graphics data items of the higher level of the hierarchy; and
      rendering the derived sub-primitive.

There may also be provided computer readable code adapted to perform the steps of any of the methods described herein when the code is run on a computer.

There may also be provided computer readable code defining a graphics processing system according to any of the examples described herein, whereby the graphics processing system is manufacturable. There may be provided computer readable code for generating a graphics processing system according to any of the examples described herein. The computer readable code may be encoded on a computer readable storage medium.

The graphics processing systems described herein may be embodied in hardware on an integrated circuit. There may be provided a method of manufacturing, at an integrated circuit manufacturing system, a graphics processing system as described herein. There may be provided an integrated circuit definition dataset that, when processed in an integrated circuit manufacturing system, configures the system to manufacture a graphics processing system as described herein. There may be provided a non-transitory computer readable storage medium having stored thereon a computer readable description of an integrated circuit that, when processed, causes a layout processing system to generate a circuit layout description used in an integrated circuit manufacturing system to manufacture a graphics processing system as described herein.

There may be provided an integrated circuit manufacturing system comprising:
- a non-transitory computer readable storage medium having stored thereon a computer readable integrated circuit description that describes a graphics processing system as described herein;
- a layout processing system configured to process the integrated circuit description so as to generate a circuit layout description of an integrated circuit embodying the graphics processing system; and
- an integrated circuit generation system configured to manufacture the graphics processing system according to the circuit layout description.

There may be provided computer program code for performing any of the methods described herein. There may be provided non-transitory computer readable storage medium having stored thereon computer readable instructions that, when executed at a computer system, cause the computer system to perform any of the methods described herein.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which.

Figure 1:
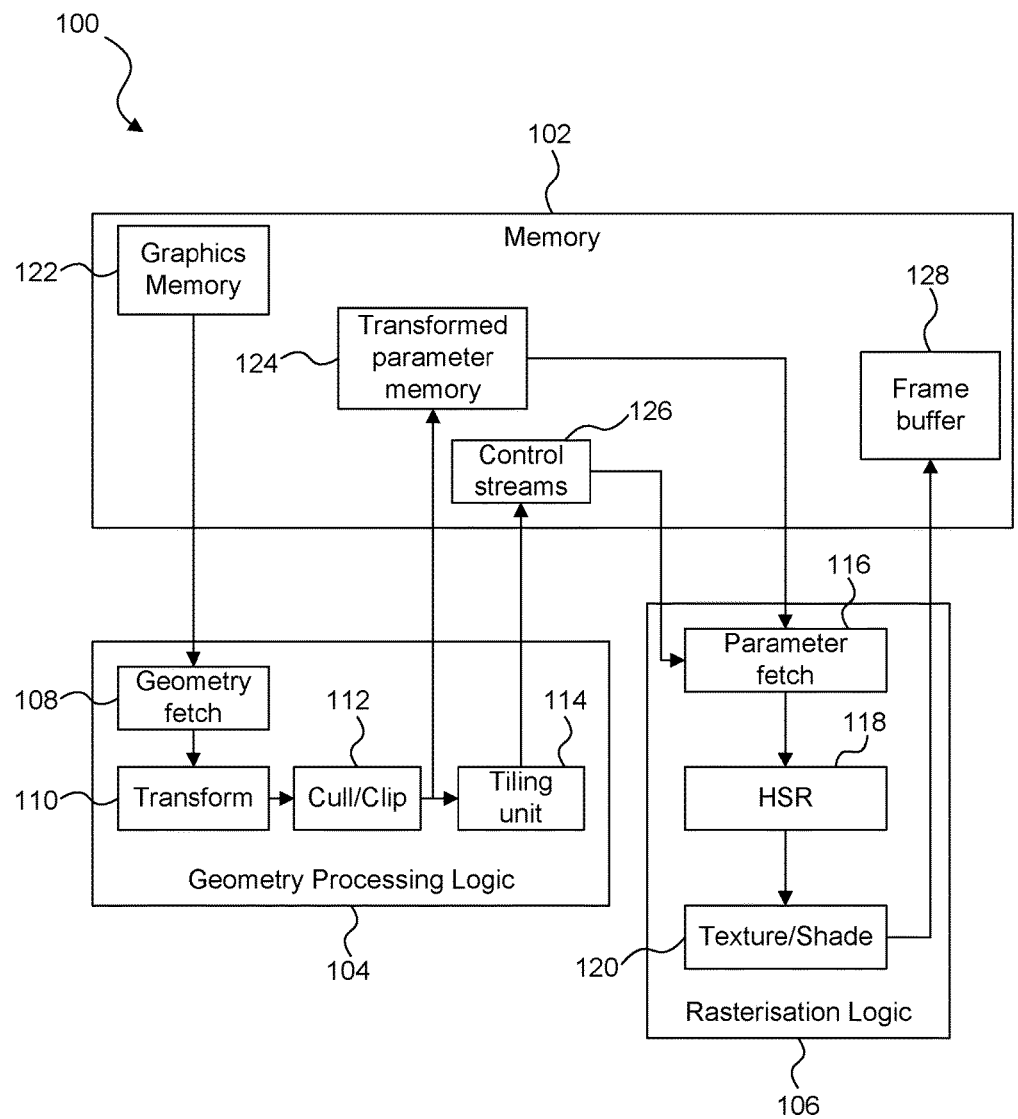
FIG. 1 shows an example of a first prior art graphics processing system which uses transformed display lists.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

Embodiments will now be described by way of example only.

According to embodiments described herein, when sub-primitives are generated from input graphics data items in a graphics processing system which uses untransformed display lists, the geometry processing logic generates, for a tile, control data which includes sub-primitive indications to indicate which of the sub-primitives are to be used for rendering the tile. The rasterisation logic can then derive sub-primitives to be used for rendering a particular tile in accordance with the sub-primitive indications in the control stream data for the particular tile. In this way the rasterisation logic can avoid performing operations (e.g. shader operations, tessellations or clipping operations) which the control stream data indicates do not result in the generation of any sub-primitives which are to be rendered within the particular tile. In this way, the amount of processing involved in the generation of sub-primitives in the rasterisation phase can be reduced based on information about the positions of sub-primitives determined during the geometry processing phase. For example, the rasterisation logic can avoid performing operations (e.g. shader operations, tessellations or clipping operations) on sub-primitives which the control stream data indicates are not required in the rendering within the particular tile.

According to other embodiments, a hierarchical cache scheme may be used to store a hierarchy of graphics data items, e.g. including input graphics data items and results of processing stages implemented to derive the sub-primitives from the input graphics data items. The hierarchical cache scheme is used in the rasterisation phase. Lookup into the hierarchical caching scheme operates in a bottom-up manner, such that if a sub-primitive is stored in the cache then it can be retrieved from the cache without performing any of the processing stages that are implemented to generate the sub-primitive from the input graphics data items. If the sub-primitive is not stored in the cache, then an attempt is made to retrieve graphics data items from the next level up within the hierarchy which can be used to derive the sub-primitive. The cache lookups continue up the hierarchy until either the sub-primitive can be derived, or the sub-primitive cannot be derived from the data stored in the cache. If the sub-primitive cannot be derived from the data stored in the cache, then input graphics data items are fetched from the graphics memory and used to derive the sub-primitives by implementing the sequence of processing stages. When a processing stage is implemented, a result of the processing stage (i.e. either a sub-primitive or a graphics data item (e.g. primitive) at a higher level of the hierarchy) is stored in the cache for subsequent use. The caching scheme can be used across different primitives and across different tiles in the rasterisation phase. The use of the caching scheme reduces the number of data fetches from memory which are performed and reduces the number of processing stages which are performed in the rasterisation phase. That is, shader outputs and clipper outputs can be shared across different primitives and/or across different tiles. The bottom-up manner in which the cache is accessed reduces the number of processing stages which are performed to derive sub-primitives within the particular tile. It is noted that in the geometry processing phase the primitive processing order is from top downwards through the hierarchy to generate sub-primitives for the entire render space; whereas in the rasterisation phase the data is processed in tiles and the primitive processing order is from bottom upwards with respect to the hierarchy and only for the sub-primitives which are in a particular tile currently being rendered. The hierarchical cache scheme is suited to the way in which primitives are processed in the rasterisation phase, and not so suited to the way in which primitives are processed in the geometry processing phase.

Figure 2:
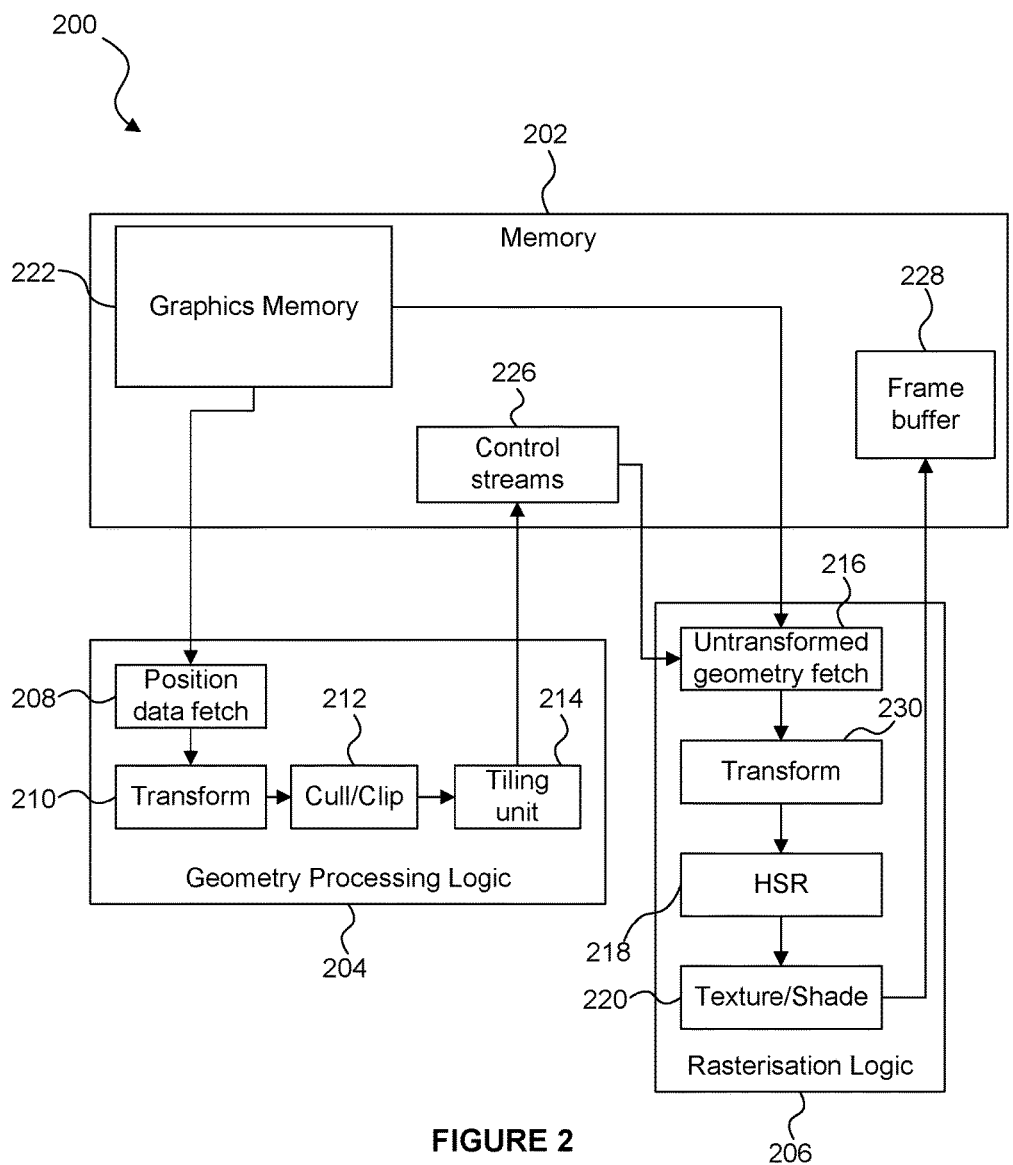
FIG. 2 shows an example of a second prior art graphics processing system which uses untransformed display lists.
Figure 3:
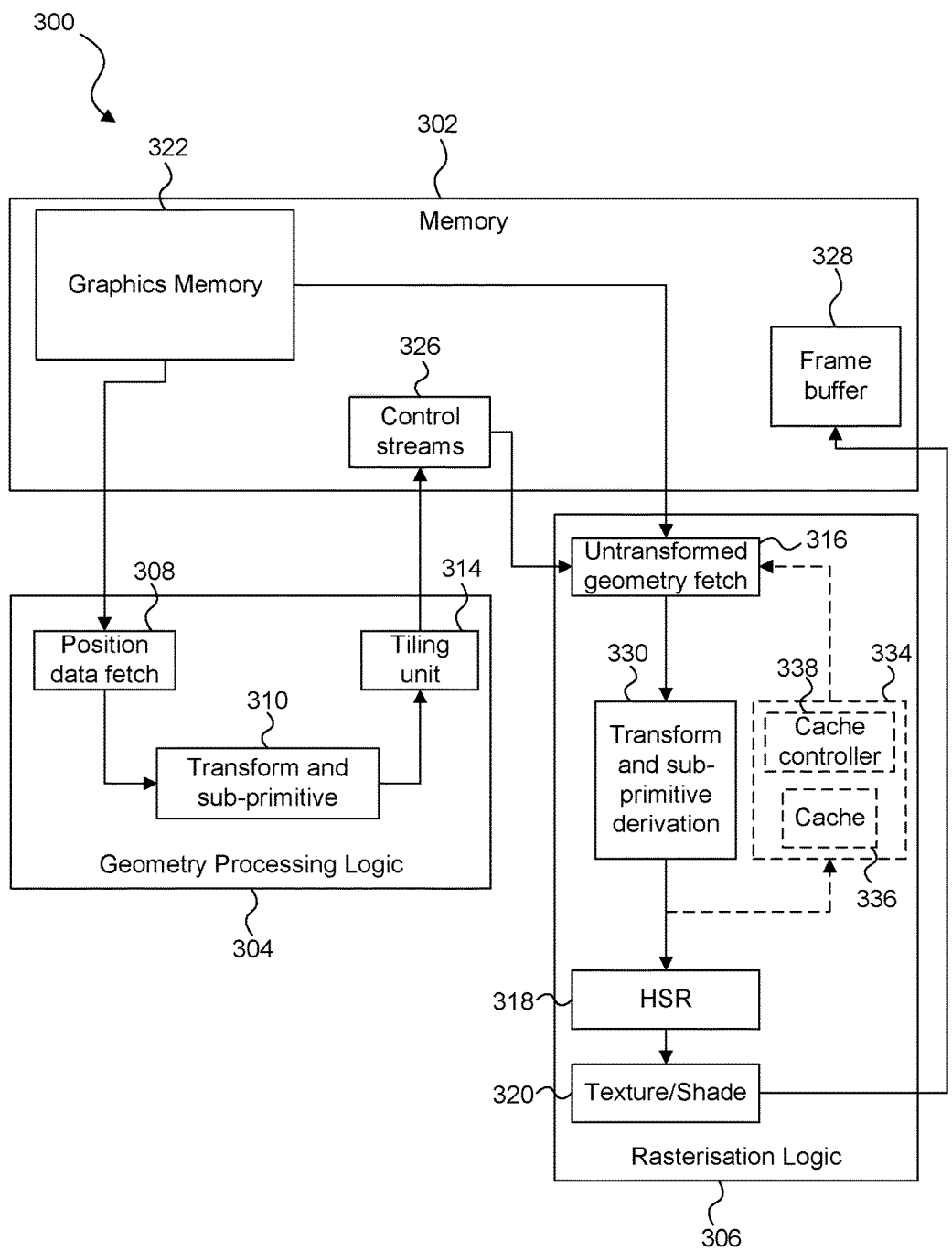
FIG. 3 shows a graphics processing system according to embodiments described herein.

FIG. 3 shows a graphics processing system 300 according to embodiments described herein. The system 300 is similar to the system 200 shown in FIG. 2, but includes components for deriving sub-primitives. In particular, system 300 comprises a memory 302, geometry processing logic 304 and rasterisation logic 306. The geometry processing logic 304 and the rasterisation logic 306 may be implemented on a GPU and may share some processing resources, as is known in the art. The geometry processing logic 304 comprises a geometry data fetch unit 308, geometry transform and sub-primitive logic 310, and a tiling unit 314. The rasterisation logic 306 comprises a fetch unit 316, rasterisation transform and sub-primitive derivation logic 330, a HSR unit 318, and a texturing/shading unit 320. The rasterisation logic 306 may also comprise a cache system 334 which includes a cache 336 and a cache controller 338. The cache system 334 is shown with dashed lines in FIG. 3 because in some embodiments the cache system 334 might not be implemented, but in other embodiments the cache system 334 is implemented. The memory 302 may be implemented as one or more physical blocks of memory, and includes a graphics memory 322, a control stream memory 326 and a frame buffer 328.

Figure 4:
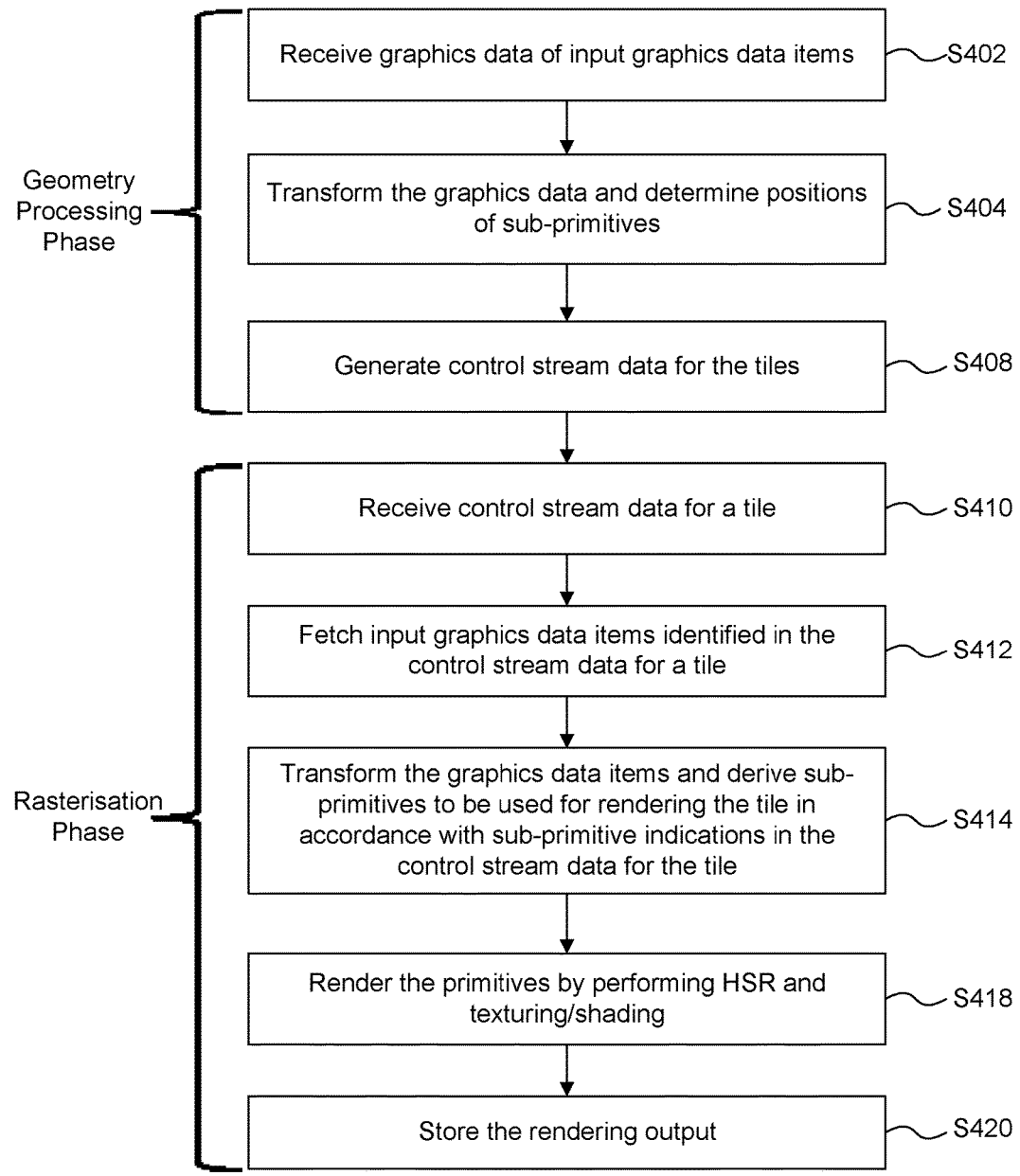
FIG. 4 is a flow chart showing a method of generating a rendering output in a graphics processing system.

Operation of the system 300 is described in one example with reference to the flow chart shown in FIG. 4. In this example, the cache system 334 is not described as being implemented, but in some embodiments the cache system 334 could be implemented with the method shown in FIG. 4.

In step S402 the geometry data fetch unit 308 fetches geometry data from the graphics memory 322 and passes the fetched data to the transform and sub-primitive logic 310. The fetched data may be "position data" which may include data for use in computing the position of graphics data items. For example, the fetch unit 308 might fetch only position data of the graphics data items because other data of the graphics data items (e.g. colour data or texture data to be applied to the graphics data items, etc.) is not needed by the geometry processing logic 304. As described above, the graphics data items may for example be primitives or control points describing a patch to be tessellated.

In step S404 the transform and sub-primitive logic 310 transforms the position data of the graphics data items into the rendering space. Further in step S404 the transform and sub-primitive logic 310 determines transformed positions within the rendering space of one or more sub-primitives derived from the input graphics data items. Step S404 may involve performing a number of different functions because sub-primitives may be derived from the input graphics data items in a number of different ways. In particular, the transform and sub-primitive logic 310 may comprise one or more processing modules for deriving the transformed sub-primitives from the input graphics data items, e.g. a vertex shading module, a geometry shading module and/or a tessellation module. The transform and sub-primitive logic 310 also comprises a clip/cull unit which is similar to the clip/cull units described above in relation to FIGS. 1 and 2. The positions of sub-primitives derived by the transform and sub-primitive logic 310, and the transformed position data of graphics data items from which no sub-primitives are derived, are provided to the cull/clip unit for clipping and/or culling of graphics data items which do not fall completely within the rendering space.

Figure 5:
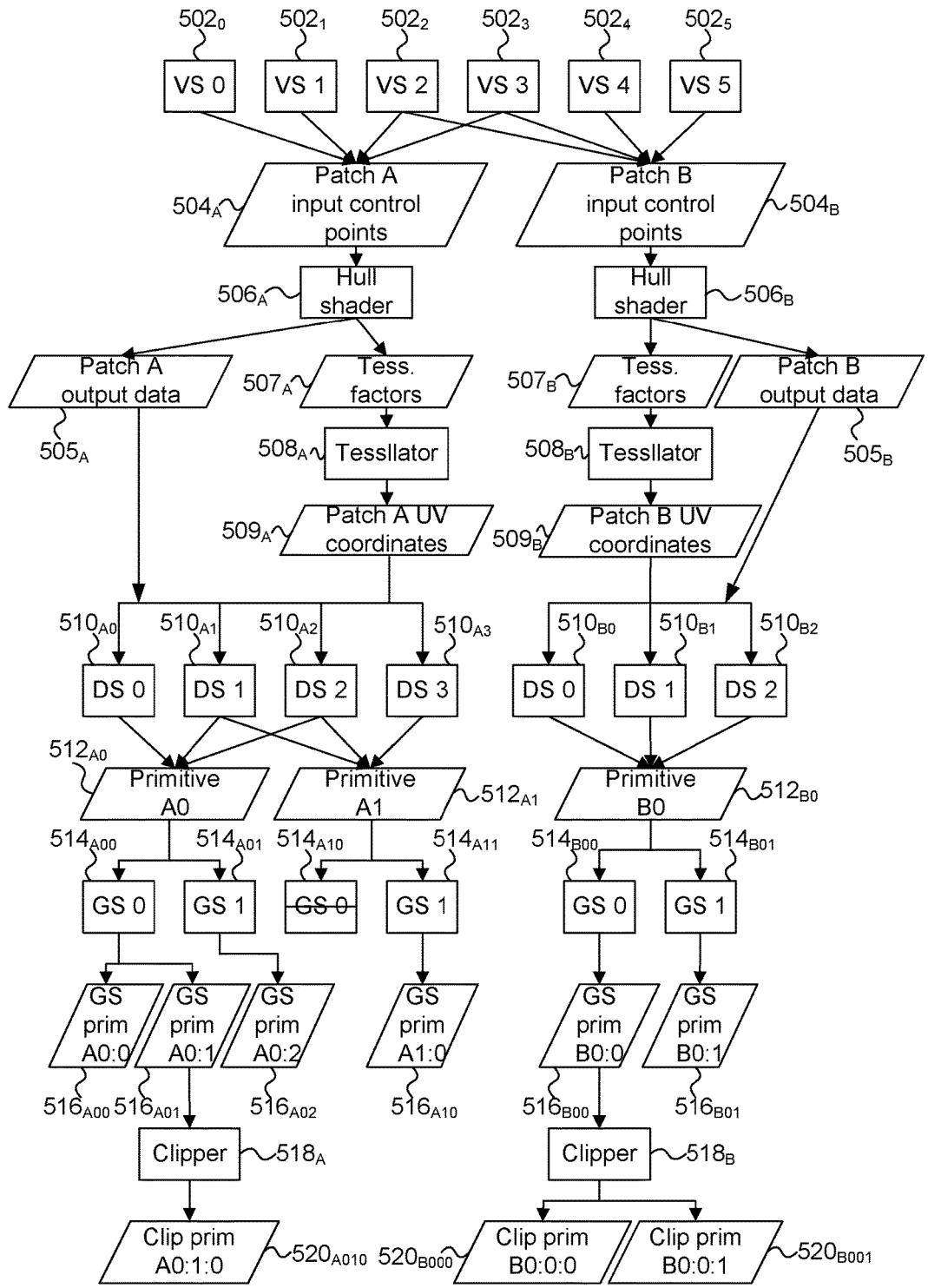
FIG. 5 shows an example of a sequence of processing stages used to generate sub-primitives from input graphics data items.

FIG. 5 shows an example of a sequence of processing stages by which sub-primitives are derived from input graphics data items. Rectangles represent operations while parallelograms represent their inputs and outputs. The output of an operation can be read as an input by multiple operations in the lower levels of the hierarchy. The examples described herein refer to the transform and sub-primitive logic 310 acting on graphics data items, without explicitly saying, although it is to be understood to be the case, that it is the position data of those graphics data items on which the transform and sub-primitive logic 310 acts. FIG. 5 shows two patches ($504_A$ and $504_B$) which both include four input control points. Two of the control points are shared by both of the patches 504, such that there are six different control points in the example shown in FIG. 5. A respective vertex shader instance ($502_0$ to $502_5$) is used by the transform and sub-primitive logic 310 to transform the six control points into the rendering space. The outputs from vertex shaders $502_0$ to $502_3$ describe the first patch $504_A$, and the outputs from vertex shaders $502_2$ to $502_5$ describe the second patch $504_B$. The transform and sub-primitive logic 310 implements two instances of a hull shader $506_A$ and $506_B$ (one for each of the patches $504_A$ and $504_B$) and two instances of a fixed-function tessellator $508_A$ and $508_B$. Each hull shader instance ($506_A$ and $506_B$) generates the tessellation factors ($507_A$ and $507_B$), which define the tessellated primitives representing the respective patches $504_A$ and $504_B$. The hull shader instances ($506_A$ and $506_B$) also generate other patch output data ($505_A$ and $505_B$) including the output control points and the patch constant data to be used in domain shader. The hull shader instances 506 prepare the tessellation factors $507_A$ and $507_B$, and the tessellators 508 perform the tessellation to generate the vertex UV coordinates $509_A$ and $509_B$ that define the tessellated primitives. In the simple example shown in FIG. 5, the patch A $504_A$ produces two tessellated primitives, while patch B $504_B$ produces one tessellated primitive (due to different tessellation factors). It should be apparent that in other examples different numbers of primitives may be produced by the tessellation, and in particular many more than two primitives may be produced, e.g. tens, hundreds or even thousands of primitives may be produced by tessellating a patch. Vertex data for vertices of tessellated primitives (which are defined by the vertex UV coordinates 509 from tessellators 508, and the output control points and other graphics patch data items 505 from hull shaders 506) are input into the domain shader instances 510 which are used to manipulate the tessellated vertices, e.g. to apply a height map to the vertices, etc. The transform and sub-primitive logic 310 implements seven instances of a domain shader ($510_{A0}$ to $510_{A3}$ and $510_{B0}$ to $510_{B2}$) which apply respective transforms to the vertices of the tessellated primitives representing the patches $504_A$ and $504_B$. The transformed vertices provided by domain shaders $510_{A0}$, $510_{A1}$ and $510_{A2}$ represent tessellated primitive $512_{A0}$. The transformed vertices provided by domain shaders $510_{A1}$, $510_{A2}$ and $510_{A3}$ represent tessellated primitive $512_{A1}$. The transformed vertices provided by domain shaders $510_{B0}$, $510_{B1}$ and $510_{B2}$ represent tessellated primitive $512_{B0}$. It is noted that vertices for tessellated primitives produced from the same patch can be shared (e.g. primitives $512_{A0}$ and $512_{A1}$ share two vertices). The tessellated primitives ($512_{A0}$, $512_{A1}$ and $512_{B0}$) generated by the tessellation stages are fed into a geometry shader (GS) stage of the transform and sub-primitive logic 310, which is configured to run two instances of a geometry shader per primitive. The number of primitives generated by each GS instance varies from 0 to an upper bound specified by the application (e.g. up to 256) depending on the operation that the GS instances are arranged to perform. In the simple example shown in FIG. 5, from 0 to 2 primitives are produced by each of the GS instances. In particular, the GS instance $514_{A00}$ is applied to the primitive $512_{A0}$ and produces two primitives $516_{A00}$ and $516_{A01}$; the GS instance $514_{A01}$ is applied to the primitive $512_{A0}$ and produces one primitive $516_{A02}$; the GS instance $514_{A10}$ is applied to the primitive $512_{A1}$ and produces zero primitives; the GS instance $514_{A11}$ is applied to the primitive $512_{A1}$ and produces one primitive $516_{A10}$; the GS instance $514_{B00}$ is applied to the primitive $512_{B0}$ and produces one primitive $516_{B00}$; and the GS instance $514_{B01}$ is applied to the primitive $512_{B0}$ and produces one primitive $516_{B01}$.

As described above, the transform and sub-primitive logic 310 can clip some of the primitives if they extend outside of the viewing frustum, but some of the GS generated primitives are not clipped in the example shown in FIG. 5. For example, when a primitive is clipped, up to fifteen sub-primitives (seventeen vertices) may be produced when using the six standard clipping planes and eight custom clipping planes. However, in the simple example shown in FIG. 5, the primitive $516_{A01}$ is clipped to produce one primitive $520_{A010}$ and the primitive $516_{B00}$ is clipped to produce two primitives $520_{B000}$ and $520_{B001}$. The primitives $516_{A00}$, $516_{A02}$, $516_{A10}$ and $516_{B01}$ are not clipped. The leaf nodes of the hierarchy (i.e. primitives $516_{A00}$, $520_{A010}$, $516_{A02}$, $516_{A10}$, $520_{B000}$, $520_{B001}$ and $516_{B01}$ in the example shown in FIG. 5) are the sub-primitives which are to be rendered. In some examples, input primitives may pass through the transform and sub-primitive logic 310 without any sub-primitives being generated, such that the clipping may be applied to input primitives in some examples. Therefore, in general, the transform and sub-primitive logic 310 culls and/or clips graphics data items (including the derived sub-primitives) which are situated outside of a viewing frustum. The remaining primitives and sub-primitives are passed to the tiling unit 314.

In step S408 the tiling unit 314 generates control stream data for each of the tiles of the rendering space. The control stream data for a tile includes identifiers of input graphics data items which are to be used for rendering the tile, e.g. primitives from the graphics memory 322 which, when transformed, are positioned at least partially within the tile or primitives from the graphics memory 322 from which sub-primitives are derived which are positioned at least partially within the tile. The identifiers in the control stream data identify input graphics data items, i.e. graphics data items stored in the graphics memory 222. The control stream data for a tile also includes sub-primitive indications to indicate which of the sub-primitives are to be used for rendering the tile. A sub-primitive may be determined to be for use in rendering a tile if the sub-primitive is at least partially in the tile. As will be explained in more detail below, the sub-primitive indications can be used during the rasterisation phase to reduce the amount of processing which is performed to derive the sub-primitives for a tile. The sub-primitive indications may, for example, indicate how to derive the sub-primitives to be used for rendering a tile from the transformed input graphics data items. For example, the sub-primitive indications may indicate a sequence of processing operations which are performed on the input graphics data items in order to generate the sub-primitives which are to be rendered. Therefore, the rasterisation phase can perform the indicated operations (but does not need to perform operations which are not indicated) in order to derive the necessary sub-primitives to be rendered for a tile. For example, the sub-primitive indications in the control stream relating to the example shown in FIG. 5 may indicate that the GS instance $514_{A10}$ does not produce any primitives, in which case this GS instance might not be executed in the rasterisation phase.

Furthermore, it may be the case that some of the sub-primitives which are the leaf nodes shown in FIG. 5 might not be positioned at least partially within a particular tile. For example, the primitive $516_{A02}$ might lie completely outside of a particular tile, in which case an indication of the sub-primitive $516_{A02}$ would not be included in the control stream data for the particular tile. Therefore, in the rasterisation phase the rasterisation logic would not need to implement the geometry shader $514_{A01}$.

The sub-primitive indications could be represented as one or more masks. For example a mask for a sub-primitive may indicate which of a set of possible operations are to be performed to derive a sub-primitive. A mask may also indicate which of a set of possible sub-primitives are culled or clipped. A mask may also indicate which sub-primitives derived from an original primitive are present in a tile, and which are not present in the tile. Furthermore, the identifiers of input graphics data items in the control stream data may be implemented as one or more masks indicating which graphics data items from blocks of graphics data items are to be used for rendering a particular tile. Identifiers of input graphics data items in the control stream data may or may not be shared among portions of the control stream data referring to different tiles, provided it is possible to reconstruct the control stream data for each of the particular tiles.

The identifiers and sub-primitive indications in the control stream data may be compressed, according to any suitable compression technique. The control stream data for the tiles is provided to the memory 302 for storage in the control stream memory 326. The geometry processing phase is complete for the current render, and at a subsequent time, the rasterisation phase is performed to render the tiles of the rendering space using the input graphics data stored in the graphics memory 322 and the control stream data stored in the control stream memory 326.

An example which does not include the cache system 334 is described first. We then go on to describe below an example which does include the cache system 334. The rendering of a particular tile in the rasterisation phase is now described. In step S410, the fetch unit 316 of the rasterisation logic 306 receives the control stream data for a tile from the control stream memory 326. In step S412 the fetch unit 316 fetches the indicated input graphics data items from the graphics memory 322, as indicated by the identifiers in the control stream data for the tile. The input graphics data items are untransformed.

In some examples, the geometry processing logic 304 (e.g. the transform and sub-primitive logic 310) may determine information describing how to group the input graphics data items into primitive blocks. This information can be passed as sideband information with the control streams. Therefore, the fetch unit 316 can receive this sideband information with the control stream data for a tile and can generate primitive blocks including the fetched input graphics data items in accordance with the sideband information. The primitive blocks, combined with the sub-primitive indications in the control stream data, allow the sub-primitives to be regenerated in the rasterisation phase. In some other examples, sideband information indicating how the input graphics data items are to be grouped into primitive blocks does not need to be passed from the geometry processing logic 304 to the rasterisation logic 306, and instead the fetch unit 316 can determine how to group the input graphics data items into primitive blocks.

In step S414 the transform and sub-primitive derivation logic 330 transforms the fetched graphics data items into the rendering space. The sub-primitive indications in the control stream data for the particular tile currently being rendered are also provided to the transform and sub-primitive derivation logic 330 (this may be directly from the control stream memory 326 or from the fetch unit 316). Further in step S414 the transform and sub-primitive derivation logic 330 derives sub-primitives to be used for rendering the particular tile in accordance with the sub-primitive indications in the control stream data for the particular tile.

As described above, the sub-primitive indications in the control stream data may be used by the transform and sub-primitive derivation logic 330 to selectively perform only those processes which are needed for deriving sub-primitives which are present within the particular tile. That is, the transform and sub-primitive derivation logic 330 can use the sub-primitive indications to identify which processes are not necessary for deriving the sub-primitives in the tile, such that those unnecessary processes are not performed by the transform and sub-primitive derivation logic 330 in the rasterisation phase. It is noted that those processes would have been performed by the transform and sub-primitive logic 310 in the geometry processing phase in order to determine that they do not lead to sub-primitives which are present in the particular tile, but these processes do not need to be duplicated in the rasterisation phase. The sub-primitive indications in the control stream data may be hierarchical indices, wherein the sub-primitive indication for a particular sub-primitive indicates one or more graphics data items at different levels of a hierarchy (e.g. as shown in FIG. 5) for use in deriving the particular sub-primitive. The transform and sub-primitive derivation logic 330 can use the hierarchical index for the particular sub-primitive to identify the one or more graphics data items of the hierarchy for use in deriving the particular sub-primitive. For example, the sub-primitive indication for primitive $520_{A010}$ as shown in FIG. 5 may be a hierarchical index which identifies that the primitive $520_{A010}$ is derived from a sequence of graphics data items including the patch input control points $504_A$, the patch output data $505_A$ in conjunction with the vertex UV coordinates $509_A$, the tessellation generated primitive $512_{A0}$ and the geometry shader generated primitive $516_{A01}$. This allows the transform and sub-primitive derivation logic 330 to easily identify the processing steps which are needed to derive a sub-primitive.

For example, with reference to FIG. 5, only primitives which were partially clipped in geometry processing phase (i.e. primitives $516_{A01}$ and $516_{B00}$ in the example shown in FIG. 5) need to be clipped again in the rasterisation phase, and the transform and sub-primitive derivation logic 330 can use the sub-primitive indications in the control stream data to determine that clipping does not need to be applied to other primitives, without further determination steps and without attempting to apply clipping to other primitives. As another example, the transform and sub-primitive derivation logic 330 in the rasterisation logic 306 can determine from the sub-primitive indications in the control stream data that the first GS instance $514_{A10}$ for tessellated primitive A1 does not generate any sub-primitives, therefore the execution of the GS instance $514_{A10}$ can be avoided in the rasterisation phase.

The transform and sub-primitive derivation logic 330 outputs the derived sub-primitives, and any input primitives for which sub-primitives are not derived, for rendering, in step S418, by one or more processing units to thereby generate a rendering output for the particular tile. In the example shown in FIG. 3, the processing units are the HSR unit 318 which removes primitive fragments which are hidden, and the texturing/shading unit 320 which applies one or both of texturing and shading to primitive fragments. However, in other examples, different processing may be performed to render the primitives and sub-primitives which are output from the transform and sub-primitive derivation logic 330. Furthermore, the example system 300 shown in FIG. 3 is a deferred rendering system in the sense that hidden surface removal is performed on a primitive fragment prior to texturing and/or shading of the primitive fragment. In other examples the system might not be a deferred rendering system such that hidden surface removal is performed on a primitive fragment subsequent to texturing and/or shading of the primitive fragment. The principles described herein of using sub-primitive indications in the control stream data for a tile so that not all of the processing stages involved in deriving sub-primitives from input graphics data items need to be duplicated in the rasterisation phase can be applied to non-deferred rendering system as well as to deferred rendering systems.

In step S420 the resulting rendered pixel values are provided to the memory 302 for storage in the frame buffer 328 and can subsequently be used, e.g. displayed on a display or stored in memory or transmitted to another device, etc.

A method is described above with reference to the flow chart shown in FIG. 4 which does not implement the cache system 334. In other examples, the cache system 334 is implemented. The use of the cache system 334 is described below with reference to FIGS. 6 and 7. The cache system 334 comprises a cache 336 and a cache controller 338. The cache controller 338 may be implemented in hardware, software or a combination thereof. The cache 336 is configured to store graphics data items, (i.e. transformed input graphics data items and/or derived sub-primitives) which are output from the transform and sub-primitive derivation logic 330. The cache stores the graphics data items as a hierarchy of graphics data items with different levels of the hierarchy representing different processing stages of a sequence of processing stages used to derive sub-primitives from the input graphics data items. For example, as described above, FIG. 5 shows sequences of processing stages which can be performed to derive sub-primitives. The fetched input graphics data items and the results of the different processing stages, including the final derived sub-primitives, are stored in the cache at appropriate levels within the hierarchical cache structure. For example, the clipper generated primitives 520 (which may be in the form of triangle fans) may be considered to be at level 0 of the hierarchy; the GS generated primitives 516 may be considered to be at level 1 of the hierarchy; the-tessellation generated primitives 512 may be considered to be at level 2 of the hierarchy; the patch output data 505 in conjunction with the vertex UV coordinates 509 may be considered to be at level 3 of the hierarchy; the patch input control points 504 may be considered to be at level 4 of the hierarchy; and the input graphics data items may be considered to be at level 5 of the hierarchy. In some other examples, to save space in the cache 336, since the clipping is a relatively inexpensive computation, the clipper output might not be stored in the cache 336, and the clipper can be re-executed when it is needed. In the examples described herein, reference is made to storing "primitives" or storing "sub-primitives" in the cache 336. In some examples, primitives (including "sub-primitives") may be stored as discrete items in the cache 336. However, it will be apparent to those skilled in the art that primitives (including "sub-primitives") may be described by multiple graphics data items, e.g. multiple vertices, such that in order to store a primitive, in some examples a plurality of graphics data items (e.g. vertices) may be stored in the cache 336, such that "storing a primitive (or sub-primitive) in the cache" may actually involve storing multiple graphics data items in the cache 336. Furthermore, different primitives may share one or more vertices, such that the cache 336 may store some but not all of the vertices of a primitive.

Figure 6:
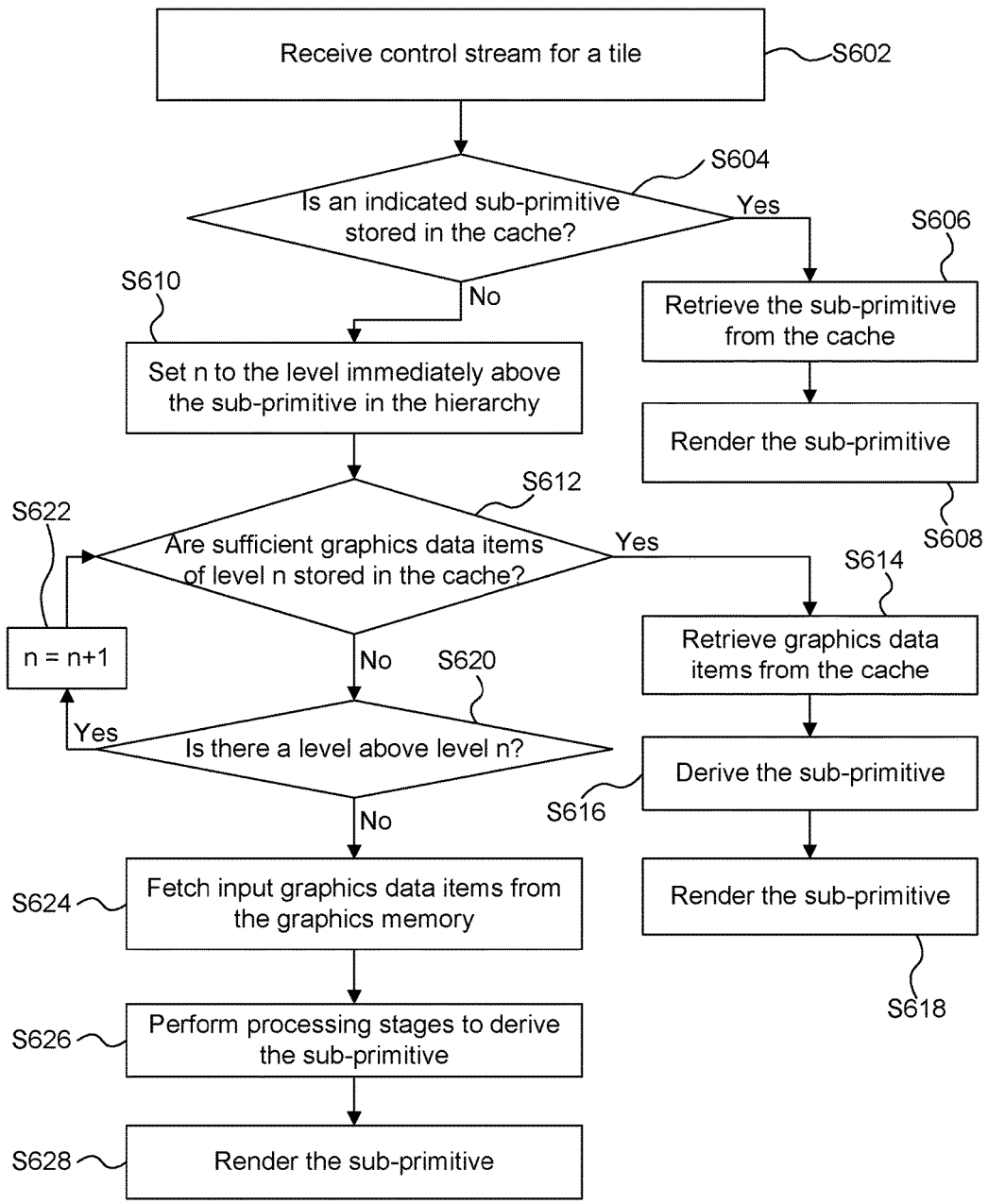
FIG. 6 is a flow chart showing a method of rendering a sub-primitive in a graphics processing system using a hierarchical cache.

The flow chart shown in FIG. 6 illustrates a method of using the cache 336 in the rasterisation phase. In step S602 the control stream data for a tile is received at the fetch unit 316. As described above, the control stream data for a tile includes identifiers of graphics data items and sub-primitive indications which indicate sub-primitives which are to be used for rendering a tile. For a sub-primitive that is indicated in the control stream data for a tile, the fetch unit 316 can poll the cache system 334 to determine whether the sub-primitive is stored in the cache 336 or whether the sub-primitive will need to be derived. For example, the sub-primitive which is being requested may be the primitive $516_{A00}$ as shown in FIG. 5.

In response to a request from the fetch unit 316 for a sub-primitive, the cache controller 338 determines, in step S604, whether the sub-primitive is stored in the cache 336. The sub-primitive is composed of one or multiple graphics data items, which may be generated by different operations. For instance, a tessellation-generated triangle is composed of three graphics data items (e.g. vertices in this case), which are the output of three domain shader invocations. A sub-primitive is stored in the cache 336 by storing all of the graphics data-items (e.g. all of the vertices) for that sub-primitive in the cache 336. If the sub-primitive is stored in the cache 336 then, in step S606, the sub-primitive is retrieved from the cache 336. The retrieved sub-primitive can bypass the transform and sub-primitive derivation logic 330, and be provided to the processing units (i.e. to the HSR unit 318 and the texturing/shading unit 320 in the example shown in FIG. 3) for rendering in step S608. As described in more detail below, it may be the case that some but not all of the graphics data items (e.g. vertices) for a sub-primitive are stored in the cache 336; and if this is the case then the graphics data items for the sub-primitive that are stored in the cache can be retrieved from the cache 336, and the graphics data items for the sub-primitive that are not stored in the cache can be derived. In this way all of the graphics data items for the sub-primitive can be provided to the processing units (i.e. to the HSR unit 318 and the texturing/shading unit 320 in the example shown in FIG. 3) for rendering in step S608, S618 or S628. The derived graphics data items for the sub-primitive may be stored in the cache 336 for later use.

However, if in step S604 the cache controller 338 determines that the sub-primitive is not stored in the cache 336 (i.e., one or more of the graphics data items for the sub-primitive is not stored in the cache 336) then the method passes from step S604 to step S610. In step S610 the cache controller 338 sets a variable n to a value indicating the level immediately above the sub-primitive in the hierarchy. For example, as described above, the primitives 516 shown in FIG. 5 may represent level 1 of the hierarchy, so the level immediately above this level is level 2. Therefore, in step S610 $n$ is set to a value of 2 in this example.

In step S612 the cache controller 338 determines whether one or more graphics data items of the higher level (i.e. level 2) of the hierarchy are stored in the cache 336, wherein the sub-primitive would be derivable from said one or more graphics data items of the higher level. That is, the cache controller 338 determines whether there are sufficient graphics data items of level n stored in the cache 336 in order to derive the sub-primitive. In the example in which the sub-primitive to be derived is primitive $516_{A00}$ as shown in FIG. 5, step S612 involves determining whether the primitive $512_{A0}$ is stored in the cache 336 because the primitive $516_{A00}$ can be derived from the primitive $512_{A0}$ by executing the GS instance $514_{A00}$.

If it is determined in step S612 that there are sufficient graphics data items at level n stored in the cache 336 then the method passes to step S614 in which the cache controller 338 retrieves, from the cache 336, the one or more graphics data items of level n of the hierarchy which are to be used to derive the sub-primitive. For example, the cache controller 338 may retrieve the primitive $512_{A0}$ from the cache 336. The retrieved graphics data items are provided to the transform logic 330 and/or the transform and sub-primitive derivation logic 330 for use in deriving the sub-primitive to be rendered.

In step S616 the transform and sub-primitive derivation logic 330 derives the sub-primitive using the retrieved graphics data items. For example, the transform and sub-primitive derivation logic 330 may derive the sub-primitive $516_{A00}$ using the retrieved primitive $512_{A0}$ by executing the GS instance $514_{A00}$. At any stage in the hierarchy, only the computations required for deriving the sub-primitives are performed. For instance, three Domain Shader (DS) instances ($510_{A0}$, $510_{A1}$ and $510_{A2}$) provide the inputs of the Geometry Shader (GS) instance $514_{A00}$. Therefore if we want to execute the GS instance $514_{00}$ and if the output of the DS instance $510_{A0}$ is not stored the cache but the output of the DS instances $510_{A1}$ and $510_{A2}$ can be read from the cache, then the DS instance $510_{A0}$ is executed but the DS instances $510_{A1}$ and $510_{A2}$ are not executed. The derived sub-primitive (e.g. $516_{A00}$) is then rendered in step S618, as described above, by the HSR unit 318 and the texturing/shading unit 320.

If it is determined in step S612 that there are not sufficient graphics data items in the cache 336 at level n of the hierarchy (i.e. if it is determined that any of the one or more graphics data items of the higher level of the hierarchy which are used to derive the sub-primitive are not stored in the cache) then the method passes to step S620 in which the cache controller 338 determines whether there is another level in the hierarchy above level n. In the example shown in FIG. 5 there are six levels of the hierarchy (levels 0 to 5), so there is a level above level 2. Therefore, the method passes from step S620 to step S622 in which the value of n is incremented, and then the method passes back to step S612.

On this iteration, in step S612, the cache controller 338 determines whether one or more further graphics data items of level 3 are stored in the cache which can be used to derive the sub-primitive. If they are then steps S614 to S618 are performed to retrieve those further graphics data items from the cache 336, to perform the necessary processing stages on the retrieved graphics data items to derive the sub-primitive, and to render the derived sub-primitive. In the example shown in FIG. 5, steps S612 to S618 on this iteration may comprise determining whether the patch output data $505_A$ in conjunction with the vertex UV coordinates $509_A$ are stored in the cache 336. If they are then the patch output data $505_A$ in conjunction with the vertex UV coordinates $509_A$ are retrieved from the cache and the domain shader instances $510_{A0}$, $510_{A1}$ and $510_{A2}$ are executed by the transform and sub-primitive derivation logic 330 to produce the tessellated primitive $512_{A0}$ and then the geometry shader instance $514_{A00}$ is executed by the transform and sub-primitive derivation logic 330 to derive the sub-primitive $516_{A00}$. It is noted that the sub-primitive indications in the control stream indicate which processes are needed to derive the sub-primitive $516_{A00}$ from the patch output data $505_A$ in conjunction with the vertex UV coordinates $509_A$, such that the transform and sub-primitive derivation logic 330 can determine that it does not need to perform other, unnecessary processing steps, such as executing domain shader instance $510_{A3}$ or geometry shader instance $514_{A01}$. The derived sub-primitive (e.g. $516_{A00}$) is then rendered as usual in step S618 by the HSR unit 318 and the texturing/shading unit 320.

The iterations of steps S612 to S622 continue until n is set to a value such that in step S620 it is determined that there is not a level in the hierarchy above level n. In the example described with reference to FIG. 5 the highest level of the hierarchy is the input graphics data items, and for this level n=5. Therefore at this point (e.g. when n=5 in the example shown in FIG. 5) the cache controller 338 determines in step S620 that the sub-primitive cannot be derived from graphics data items stored in the cache. The method then passes from step S620 to step S624.

In step S624 the fetch unit 316 fetches one or more of the input graphics data items from the graphics memory 322 for deriving the sub-primitive. The method proceeds as described above, such that in step S626 the transform and sub-primitive derivation logic 330 performs processing on the fetched input graphics data items to derive the sub-primitive, and in step S628 the sub-primitive is rendered as described above by the HSR unit 318 and the texturing/shading unit 320. In step S626, as in step S616, only the required operations are performed at any stage of the hierarchy.

As an example, with reference to FIG. 5, the output of the vertex shaders $502_2$ and $502_3$ might already been in the cache 336 even if patch A $504_A$ has never been processed during the rasterisation phase, since they also belong to patch B $504_B$. The same principle applies to the domain shader outputs for $510_{A1}$ and $510_{A2}$, since they belong to both primitives $512_{A0}$ and $512_{A1}$. Cache hits are more likely when a primitive or patch covers many adjacent tiles.

The method shown in FIG. 6 allows sub-primitives to be derived from the information stored in the cache 336 in an efficient manner. In particular, the lowest level data from the cache that can be used to derive a sub-primitive is retrieved from the cache and used to derive the sub-primitive. In order to populate the cache 336, graphics data items may be stored in the cache when they are either fetched or derived at the rasterisation logic 306. For example, the input graphics data items fetched from the graphics memory 322 by the fetch unit 316 are stored in the cache 336. Furthermore, graphics data items (e.g. control points 504 and vertex UV coordinates 509 shown in FIG. 5 or primitives such as 512, 516 and 520 shown in FIG. 5) representing the results of performing one or more processing stages for deriving a sub-primitive (including the final sub-primitives themselves) may be stored in the cache 336 when they have been derived in the rasterisation logic 306. The same graphics data items may be used for deriving different sub-primitives. For example, the primitive $512_{A0}$ shown in FIG. 5 can be used for deriving the four primitives $516_{A0}$, $516_{A01}$, $516_{A02}$ and $520_{A010}$. Therefore, once the primitive $512_{A0}$ has been derived for determining one of those four primitives, it can be retrieved from the cache 336 for deriving the other three of those four primitives. Also, some primitives may be at least partially within more than one tile, so if they have been derived for rendering one tile, they may still be stored in the cache when another tile is rendered, and as such can be retrieved from the cache rather than deriving them from the input graphics data items again.

Figure 7:
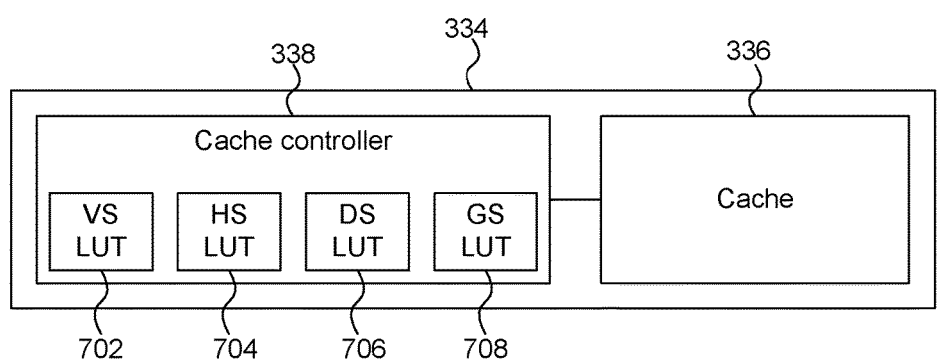
FIG. 7 is a diagram showing a cache system.

FIG. 7 shows the cache system 334 including the cache 336 and the cache controller 338. The cache controller 338 includes one or more lookup tables which are maintained to indicate the current contents of the cache 336. The lookup tables contain information about the different stages of the graphics pipeline and may or may not be implemented in the same hardware structure as each other. If the hardware structure is shared, it is partitioned by the graphics system at the start of each rendering pass to contain information about the graphics pipeline stages in use. For instance if tessellation is not used, more lookup table entries can be reserved for the vertex shader stage. The cache controller 338 can determine whether graphics data items (e.g. primitives or control points) are stored in the cache 336 by querying the lookup table(s). For example, the cache controller 338 may store a lookup table for each stage of the processing sequence. In the example shown in FIG. 7 the cache controller 338 includes four lookup tables: a vertex shader lookup table 702 which indicates if (and if so, where) the results of respective vertex shader invocations are stored in the cache 336; a hull shader lookup table 704 which indicates if (and if so, where) the results of respective hull shader invocations are stored in the cache 336; a domain shader lookup table 706 which indicates if (and if so, where) the results of respective domain shader invocations are stored in the cache 336; and a geometry shader lookup table 708 which indicates if (and if so, where) the results of respective geometry shader invocations are stored in the cache 336. The lookup tables allow searching for the result of a univocally identified execution. For example, given the draw call number, the instance identifier and the index of a vertex, a vertex shader invocation is univocally identified. Similar concepts apply to the other shader stages, with the entries in the cache 336 from different shaders being identified by a different set of values, which can generally be referred to as "tags". The amount of output produced by each shader stage can vary, and the cache 336 may allocate different maximum sizes to the outputs from the different stages. The lookup tables may be implemented as fully-associative or set-associative.

The cache 336 may be referred to as a buffer. The cache 336 may comprise a single memory pool for storage of data from all of the levels of the hierarchy, e.g. the different types of graphics data items shown in FIGS. 5 (504, 509, 512, 516 and 520) may all be stored in the same memory pool in the cache 336. This may allow flexibility in what data can be stored in the cache 336. In other examples, the cache 336 may comprise a plurality of memory pools, wherein different ones of the memory pools are configured to store data from different levels of the hierarchy. For example, a first memory pool of the cache 336 may be configured to store the input graphics data items fetched from the graphics memory 322, a second memory pool of the cache 336 may be configured to store patch input control points (e.g. 504), a third memory pool of the cache 336 may be configured to store patch output data (e.g. 505) in conjunction with vertex UV coordinates (e.g. 509), a fourth memory pool of the cache 336 may be configured to store the outputs of domain shaders (e.g. 512), a fifth memory pool of the cache 336 may be configured to store the outputs of geometry shaders (e.g. 516), and a sixth memory pool of the cache 336 may be configured to store the outputs of clippers (e.g. 520). Using different memory pools for different types of data allows data to be flushed or evicted from the cache 336 depending on the type of the data independently, and it also stops the cache 336 becoming dominated by one type of data, e.g. it stops frequently executed shader stages (such as the domain shader) evicting data from the cache 336 for less frequently executed, but potentially computationally expensive, stages (such as the hull shader).

The cache 336 has a finite size which is typically not large enough to simultaneously store all of the graphics data items which are used during the rendering of an image. Therefore, at some point data items may need to be evicted from the cache to allow other data items to be stored in the cache. The cache controller 338 uses a replacement policy to determine which data items are to be evicted. In some examples, the replacement policy is such that data items which are more likely to be used again are less likely to be evicted from the cache 336.

The tiling unit 314 of the geometry processing logic 304 may determine the number of tiles that each graphics data item covers, and can set a respective priority for each graphics data item based on the number of tiles covered by that graphics data item. The priorities can be included in the control stream data (or passed to the rasterisation logic 306 as other sideband information), such that the rasterisation logic 306 can retrieve the priorities. The cache controller 338 can then evict graphics data items from the cache 336 based on the priorities of the graphics data items, e.g. by choosing to evict one or more data items with low priorities. When a tile has been rendered, the priorities of the graphics data items in the cache 336 which were used during the rendering of the tile can be decremented, such that the priorities reflect the number of tiles which are still to be rendered for which the respective graphics data items are to be used.

The priorities are preferably determined hierarchically, such that higher level data items from the hierarchy tend to have higher priorities because they tend to cover a larger number of tiles than lower level data items. For example, a tessellated primitive might only cover one tile but the patch of which the tessellated primitive is a part might cover several tiles. As another example, the priorities associated with the geometry shader outputs (e.g. primitives 516 shown in FIG. 5) tend to be lower than the priorities associated with the domain shader outputs (e.g. primitives 512 shown in FIG. 5), which in turn tend to be lower than the priorities associated with the hull shader outputs (e.g. patch output data 505 and vertex UV coordinates 509 shown in FIG. 5) and so on up the hierarchy.

In some examples, a graphics data item containing vertices produced by the last stage of the pipeline is kept resident in the cache 336 until the HSR and shading units (318 and 320) have processed all the primitives that depend on it. For instance, a GS output may contain several primitives and a DS output may be shared by several tessellation generated primitives that cover one or multiple tiles. The primitives may cover one or multiple tiles. Once a hit in the cache 336 occurs for a graphics data item, the graphics data item is retained in the cache 336 until processing of the primitives relating to the graphics data item is completed by the HSR and shading units 318 and 320. Therefore, a strategy is used for preventing the replacement policy of the lookup tables and the cache from evicting the graphics data items which are to be used by HSR and shading. Two examples of different strategies are described here: locking and reference counting.

In the locking scheme, for each set of one or more graphics data items, one lock bit is stored for each tile being simultaneously processed by the graphics system. These lock bits can be grouped to form a lock mask for the set of one or more graphics data items. Each primitive processing unit down the graphics pipeline of the rasterisation logic 306 (e.g. the HSR unit 318 and the texturing/shading unit 320) is configured to operate in accordance with the lock mask. The lock bit for a tile within the mask for a set of one or more graphics data items is set when the graphics data item is sent for processing by the first processing unit in the pipeline (e.g. the HSR unit 318) and cleared when the primitive processing units in the pipeline (e.g. both the HSR unit 318 and the texturing/shading unit 320) have completed processing a batch of primitives corresponding to the one or more graphics data items in the set. If the lock bit is set for a set of one or more graphics data items, the set of graphics data item(s) cannot be safely evicted from the cache 336 and look-up tables 702-708, so eviction is prevented. However, if the lock bit for a set of one or more graphics data items is not set, the set of graphics data item(s) can be safely evicted from the cache 336 and look-up tables 702-708.

In the reference counting scheme, a reference count is maintained for each of a plurality of sets of one or more graphics data items. Each of the sets may for example include a single graphics data item or a plurality of graphics data items which are contiguously allocated in the cache 336. A reference count indicates the number of sub-primitives currently being processed in the pipeline which are descendants (in the hierarchy) of a graphics data item of the respective set of one or more graphics data items. The reference counts for all the graphics data items required to generate a sub-primitive are incremented when the sub-primitive is sent down the graphics pipeline for further processing and decremented after the sub-primitive has been processed by the full graphics pipeline in the rasterisation phase. If the reference count for a set of one or more graphics data items is zero, the graphics data item(s) in the set can be safely evicted from the cache 336 and look-up tables 702-708.

When storing data for a primitive, it may be the vertex data of the primitive which is stored. Primitives may share vertices, e.g. if the primitives are organised into a primitive strip or primitive mesh. Vertex data for primitives may be stored in primitive blocks, e.g. where a primitive block may store up to a maximum number of primitives (e.g. up to 64 primitives) and/or where a primitive block may store up to a maximum number of vertices (e.g. up to −32 vertices). An indexing scheme is used to identify different vertices output from transform and sub-primitive derivation logic 330 within a primitive block. Many different indexing schemes may be implemented for identifying vertices within the cache 336, and four examples of indexing schemes are described below with reference to an example shown in FIGS. 8 to 10 in which a geometry shader and a clipper are implemented (but no tessellation is implemented in this example) for deriving sub-primitives from original primitives. These schemes, in conjunction with tile control stream data allow the rasterisation logic 306 to identify a graphics data item in a primitive block needed to derive the sub-primitive in a specific tile, and allow the cache controller 338 to identify a graphics data item in the cache 336. In particular, there are three original primitives (i.e. three input primitives) denoted P0, P1 and P2 contained within a primitive block in FIGS. 8 to 10. The primitives P0 and P2 are in the tile (except for one of the clipper generated primitives from P2) currently being rendered in the rasterisation phase, but the primitive P1 is not in the tile currently being rendered. The vertices of the input primitives are labelled in FIGS. 8 to 10, with references from 0 to 6. It can be seen that the primitives P0 and P1 share two vertices: vertices 1 and 2. In this example, the geometry shader produces two primitives (denoted GS0 and GS1) from each of the input primitives, and for each pair of GS generated primitives the vertices are labelled from 0 to 3. The clipper operates on the GS generated primitives to produce clipper primitives. In particular in the examples shown in FIGS. 8 to 10, the output of the clipper operating on GS generated primitive GS0 for input primitive P0 is a single primitive; the output of the clipper operating on GS generated primitive GS1 for input primitive P0 is a pair of primitives; the output of the clipper operating on GS generated primitive GS0 for input primitive P1 is a single primitive; the output of the clipper operating on GS generated primitive GS1 for input primitive P1 is a pair of primitives; the output of the clipper operating on GS generated primitive GS0 for input primitive P2 is a pair of primitives (one of which is not in the tile, as indicated with a dashed line); and the output of the clipper operating on GS generated primitive GS1 for input primitive P2 is a pair of primitives. The final sub-primitives to be rendered are provided by the output of the clipper. The indexing applied to the vertices of the clipper output in the three different examples is described below.

Example 1: Index Mapping for all Primitives in Primitive Block

Figure 8:
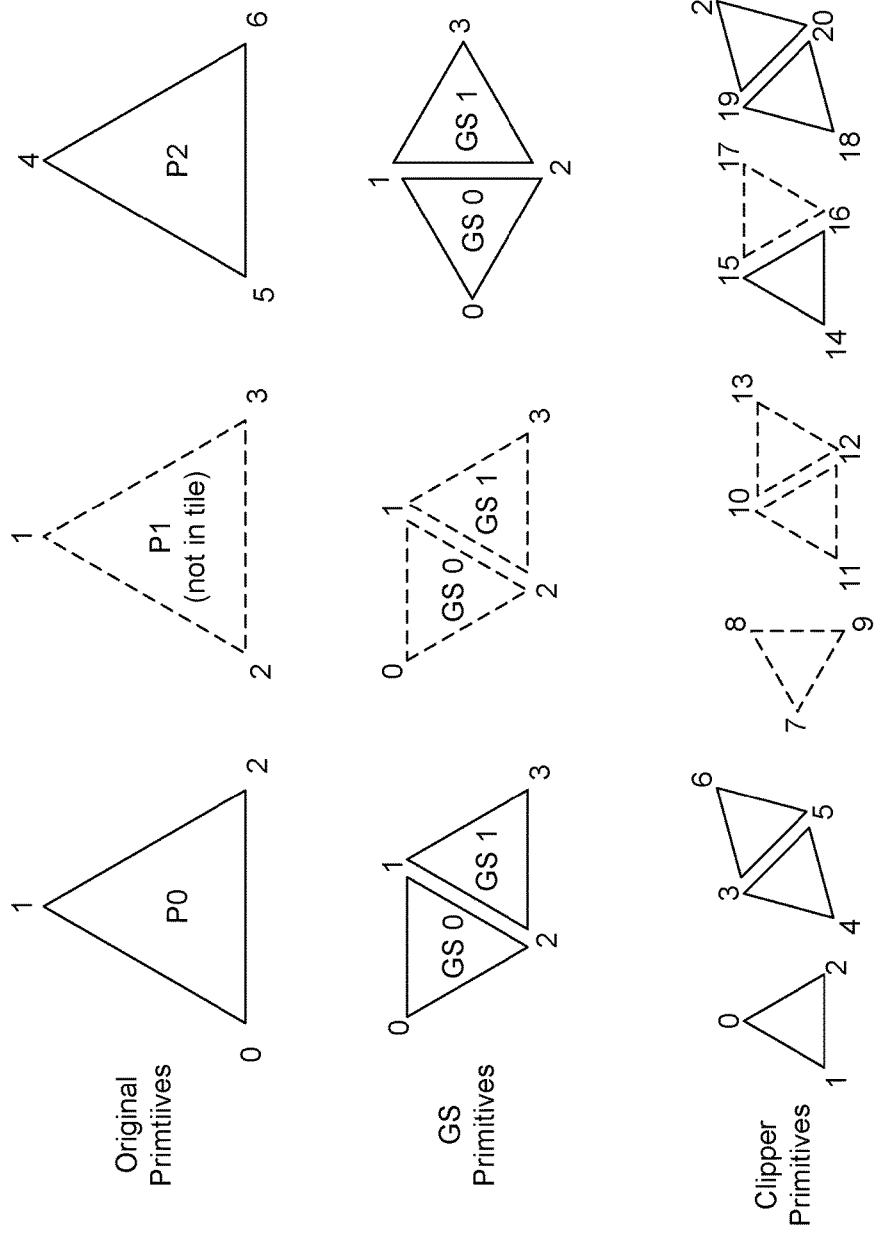
FIG. 8 shows indices assigned to vertices according to a first index mapping scheme.

In this indexing scheme indices are mapped for GS generated primitives and/or clipper generated primitives from all the original primitives in the primitive block, as shown in FIG. 8. The maximum number of GS and clipper generated primitives may be limited to 64, therefore a maximum 6 bits per index is used to map all the unique vertices in a primitive block. In this example, all of the final vertices in a primitive block are indexed in a sequential manner (e.g. from 0 to 21 as shown in FIG. 8). An advantage of this indexing scheme is that all the vertices are uniquely mapped in a primitive block. Therefore, the vertex indices can be used together with primitive block identifiers (such as primitive block ID in primitive block LUT), to uniquely identify vertices stored in the cache 336 for use in rendering multiple tiles. In other words, a vertex can be identified irrespective of the tile currently being rendered. A disadvantage of this indexing scheme is that the indications to vertex data in the graphics memory 322 for the top level primitives for all primitives in the primitive block (even those which are not present in a tile currently being rendered like P1 and one of the clipper generated triangles for P2 shown in FIG. 8) have to be read back in order to map the vertices in the entire primitive block, and this tends to increase the amount of data transferred between the system memory and the untransformed geometry fetch unit 316 in the GPU, which is a slow process.

Example 2: Index Mapping for Primitives in the Tile

Figure 9:
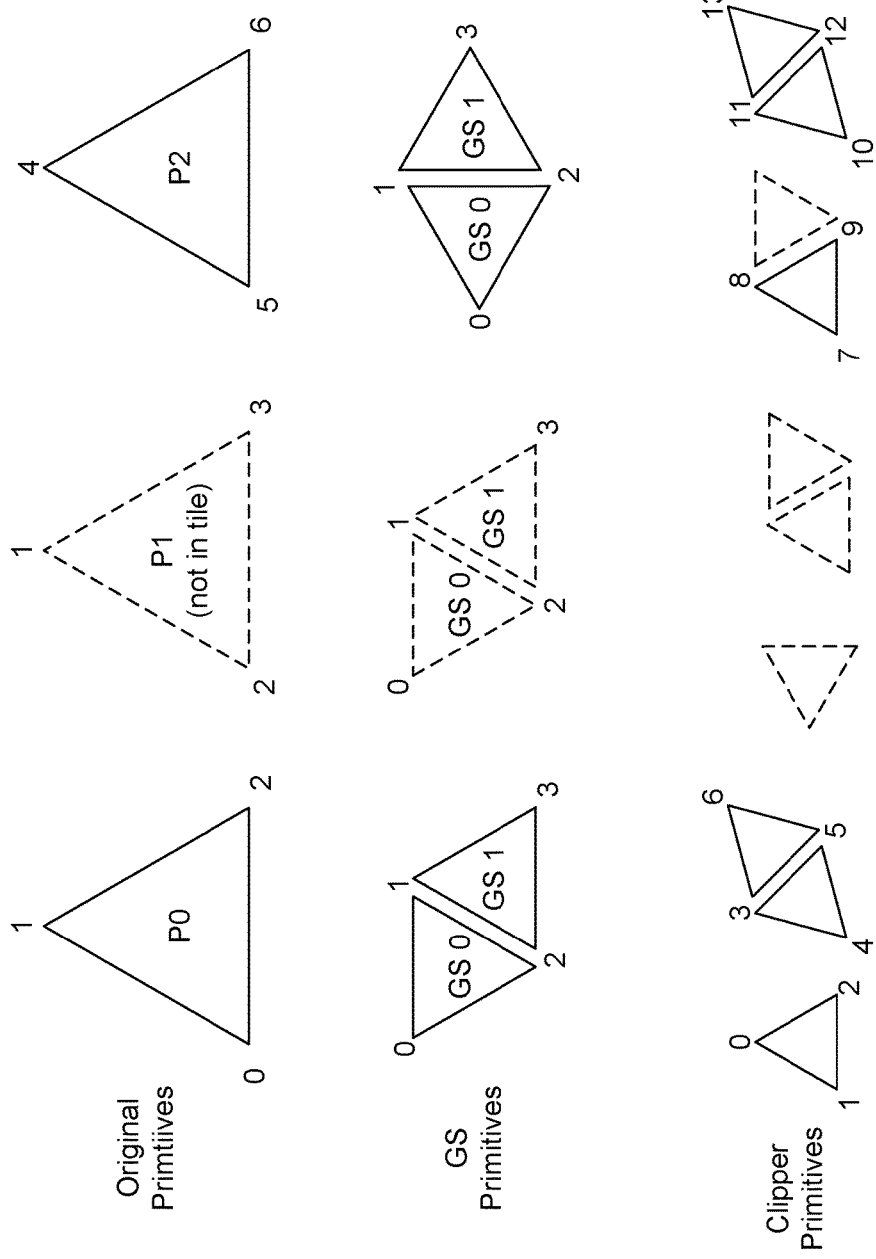
FIG. 9 shows indices assigned to vertices according to a second index mapping scheme.

In this indexing scheme indices are mapped for GS generated primitives and/or clipper generated primitives from only the original primitives in the primitive block which are present in the current tile, as shown in FIG. 9. The maximum number of GS and clipper generated primitives may be limited to 64, therefore a maximum 6 bits per index is used to map all the unique vertices in a primitive block. In this example, the final vertices in a primitive block, which are present within a current tile being rendered, are indexed in a sequential manner (e.g. from 0 to 14 as shown in FIG. 9). Indices are not assigned to the vertices of primitives (e.g. primitives derived from input primitive P1) which are not present in the current tile. An advantage of this indexing scheme is that the fetch unit 316 reads only the indications to vertex data in the graphics memory 322 for the top level primitives for the primitives which are present within the tile, which are P0 and P2 (except one of the clipper generated triangles of P2) in FIG. 9. This means that there is no wastage in the amount of data transferred from the memory 302 for reading indices of primitives which are not in the tile currently being rendered. The vertex indices can be used together with primitive block identifiers (such as primitive block ID in primitive block LUT), to uniquely identify vertices stored in the cache 336 for use in rendering the current tile. Vertex data in different primitive blocks can be stored in the cache and the primitive block ID can be used to distinguish between vertices from different primitive blocks. A disadvantage of this indexing scheme is that vertex data stored in the cache 336 cannot be shared across different tiles. This is because only primitives in the current tile are mapped, and since different primitives from a primitive block may be visible in different tiles, the cache 336 has to be invalidated between tiles to ensure that the indexing of vertices is correct.

Figure 10:
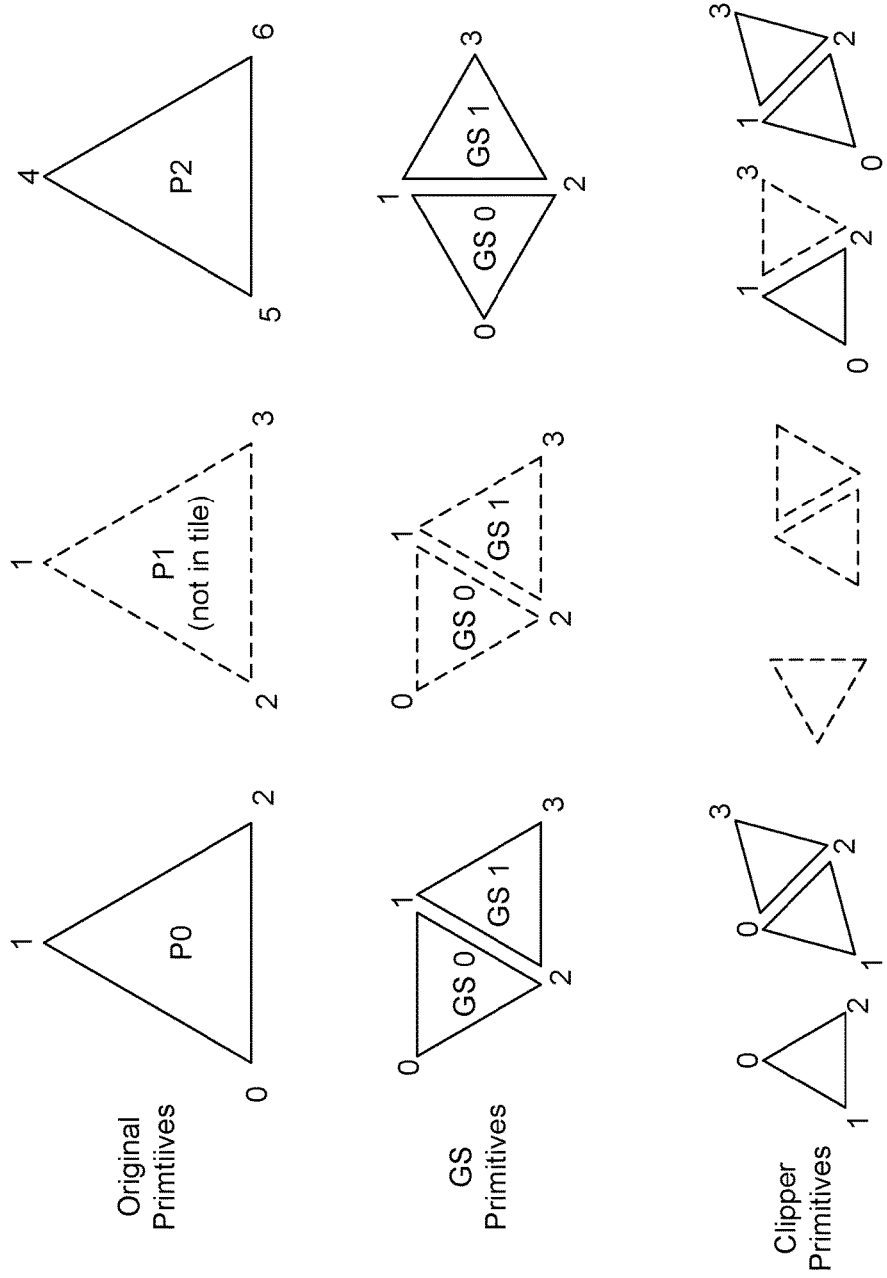
FIG. 10 shows indices assigned to vertices according to a third index mapping scheme.

Example 3: Index Mapping for Primitives in the Tile with Hierarchical Information In this indexing scheme the indices are mapped for GS generated primitives and/or clipper generated primitives independently for each original primitive in the primitive block which is visible in the current tile, as shown in FIG. 10. The primitive index in the primitive block for the original primitives, and the primitive index for GS generated primitives are needed in addition to primitive indices when primitives are generated by the clipper. For example, the hierarchical index for the first vertex of the output of the clipper executed on the geometry shader generated primitive GS0 may be given as P0:GS0:0 which indicates that the vertex is the first vertex of a primitive derived from GS0 which itself is derived from P0. In this way, vertices of each of the sub-primitives are stored in the cache 336 with a hierarchical index which indicates a hierarchy of graphics data items used to derive the sub-primitive.

If there are no GS or clipper generated primitives, the index values of the original primitives are stored in the cache 336 to indicate the original primitives. Vertices can be shared between primitives within a primitive block.

If there are primitives generated by clipper, vertices are mapped inside the clipper generated triangle strips, as shown in FIG. 10. Original primitive indices are stored in addition to the mapped indices in order to identify the vertices uniquely.

Similarly if there are primitives generated by GS, vertices are mapped inside the GS generated triangle strips, as shown in FIG. 10. Original primitive indices are stored in addition to the mapped indices in order to identify the vertices uniquely.

When primitives are generated by the clipper from the GS generated primitives, vertices are mapped inside the clipper generated triangle strips for each GS generated primitive, as shown in FIG. 10. Original primitive indices and GS generated primitive indices are stored in addition to the mapped indices in order to identify the vertices uniquely.

An advantage of this indexing scheme is that the fetch unit 316 reads only the indications to vertex data in the graphics memory 322 for the top level primitives for the primitives which are present within the tile, which are P0 and P2 (except one of the clipper generated triangles of P2) in FIG. 10. This means that there is no wastage in the amount of data transferred from the memory 302 for reading indices of primitives which are not in the tile currently being rendered. The vertex indices can be used together with primitive block identifiers (such as primitive block ID in primitive block LUT), to uniquely identify vertices stored in the cache 336 for use in rendering the current tile. Vertex data in different primitive blocks can be stored in the cache and the primitive block ID can be used to distinguish between vertices from different primitive blocks. Furthermore, because indices are mapped independently for each original primitive in the primitive block, vertex data stored in the cache 336 can be shared across different tiles.

A disadvantage of this indexing scheme is that more index information is needed in the cache 336 and LUTs. The additional index information is for the original primitive indices, for example each of 6 bits, for up to 64 original primitives and index information for GS generated primitive indices, each of 7 bits, for up to 128 GS generated primitives for GS and for clipper generated primitives. Furthermore instance ID may be optionally stored when instancing is used.

Example 4: Natural Mapping for Shader Outputs

In this scheme, the graphics data items stored in the cache 336 are not the individual vertices or control points. Instead, the graphics data items stored in the cache 336 are the output of shader invocations or clipper invocations (if the implementation decides to cache clipper generated data). Hence, a geometry shader, which outputs up to 256 vertices, only writes to a single data item. Similarly, a hull shader, which outputs patch constant data (e.g., the tessellation factors) and up to 32 control points, only writes to a single data item. A graphics data item is therefore tagged by univocally identifying the shader invocation or clipper invocation using the information already available in the graphics pipeline. For instance, unique "tags" (or "indices") for each stage can be obtained as follows:
1. VS: draw call ID, instance ID, vertex ID.
2. HS: draw call ID, instance ID, primitive ID.
3. DS: draw call ID, instance ID, primitive ID, domain index.
4. GS: draw call ID, instance ID, primitive ID, tessellated primitive index (for a given input primitive; 0 if tessellation is not used) and GS instance ID.
5. Clipper: draw call ID, instance ID, primitive ID, tessellated primitive index, GS instance ID and GS primitive index (for a given input or tessellated primitive; 0 if GS is not used).

The tags can be used in the lookup tables of the cache controller to quickly search (e.g., through Content Associative Memory) the graphics data items. A disadvantage of this scheme is that it uses several bits for the tags (i.e. for the indices). However, to mitigate this issue, index remapping schemes can be used to combine one or more of the IDs together, for instance, the draw call ID and the instance ID may be combined into a single value. For instance, instead of using N bits for the draw call ID and M bits for the instance ID, K bits may suffice to identify the global instance ID across draw calls, where K<N+M.

The scheme has three main advantages.
1. Tagging shader outputs rather than individual vertices and control points reduces the number of lookup table entries that are required.
2. The tags are naturally shared across tiles and across primitive blocks. Since an "original primitive" (i.e. a primitive in the graphics memory 322 with no parent graphics data items in the hierarchy) may generate thousands of tessellation generated primitive, it is practical for implementation to allow the original primitive to span several primitive blocks. With this scheme, the vertex and hull shader outputs can be naturally be shared across primitive blocks, since the primitive block ID is not used to generate the index or tag.
3. The logic to generate the tags and to interpret the tags is simple as the information (e.g. the draw call ID, instance ID, vertex ID, primitive ID, domain index, tessellation primitive index and geometry shader primitive index) is naturally available in the graphics pipeline.

In the examples described above the input graphics data items (which may for example be primitives or control points describing patches) describe geometry within a 3D scene to be rendered, wherein the rendered sub-primitives are for use in forming a rendered image of the scene. In other examples, the rendered sub-primitives may be for other uses than forming a rendered image of a scene. For example, the input graphics data items may describe a texture, and the rendered sub-primitives may be for use in forming a rendered image and subsequently to be used as a texture in other renders.

Figure 11:
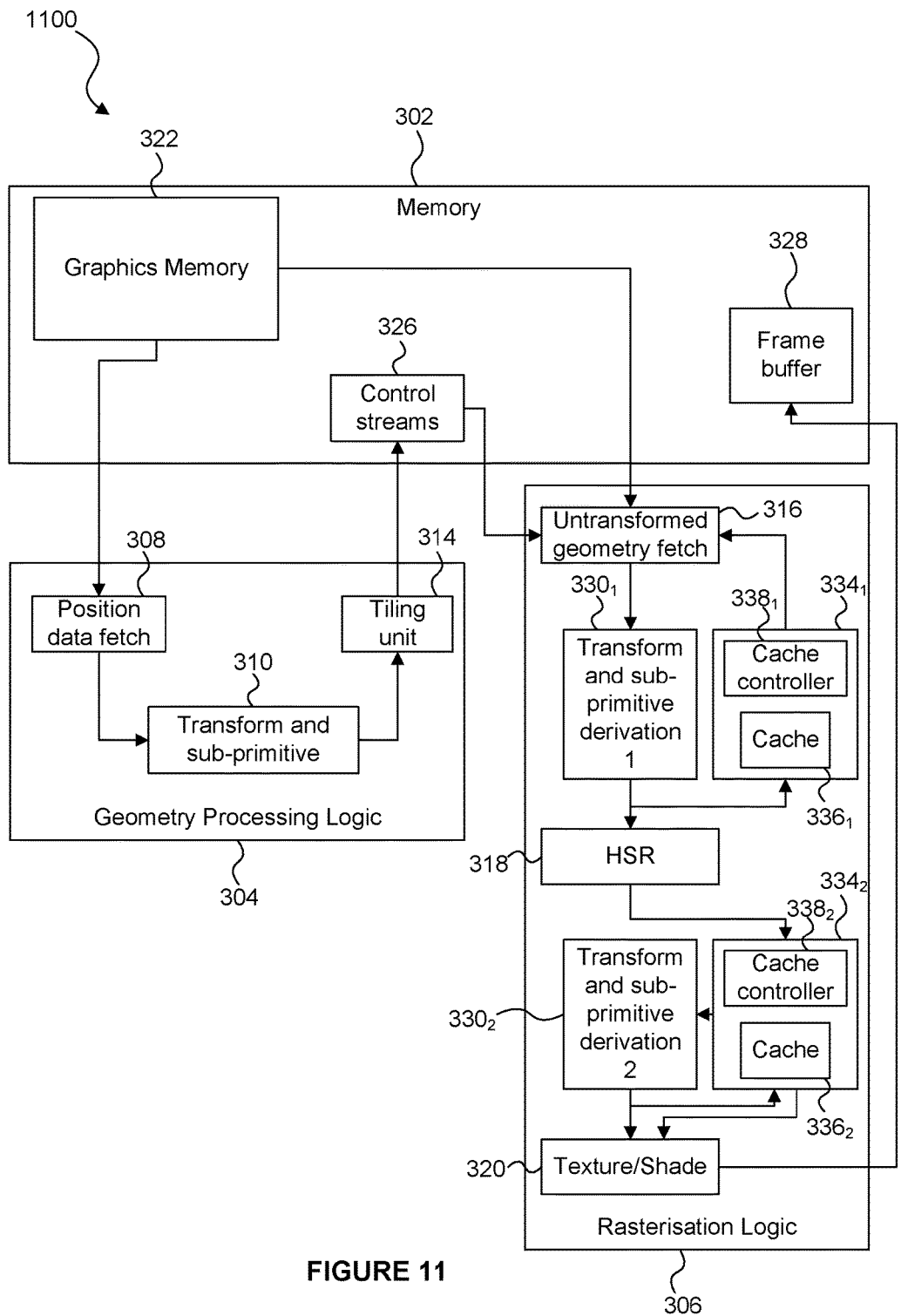
FIG. 11 shows a graphics processing system according to alternative embodiments.

In the examples described above, the cache is implemented in the rasterisation logic 306 prior to the HSR unit 318 and the texturing/shading unit 320 in the processing pipeline. In some other examples, e.g. in system 1100 as shown in FIG. 11, the transform and sub-primitive derivation logic 330 may be implemented in two subsystems $330_1$ and $330_2$, along with a respective two cache subsystems $334_1$ and $334_2$: a first subsystem ($330_1$ and $334_1$) being implemented before the HSR unit 318 and a second subsystem ($330_2$ and $334_2$) being implemented after the HSR unit 318 (but before the texturing/shading unit 320) in the processing pipeline. The components shown in FIG. 11 which have the same reference numerals as those in FIG. 3 operate in the same manner. The first cache subsystem $334_1$ includes a first cache $336_1$ and a first cache controller $338_1$; and the second cache subsystem $334_2$ includes a second cache $336_2$ and a second cache controller $338_2$. In these examples, the first subsystem ($330_1$ and $334_1$) may be configured to operate only on the position data of the graphics data items, and to store the results of the sub-primitive derivation in a hierarchical cache $336_1$ of the first subsystem as described above. The HSR unit 318 only operates on position data so there is no need to transform non-position attributes prior to the operation of the HSR unit 318. For graphics data items that are output from the HSR unit 318 (i.e. not removed by the HSR unit 318) the second subsystem ($330_2$ and $334_2$) operates on non-position attributes (and optionally on position attributes), wherein the results of the sub-primitive derivation may be stored in a hierarchical cache $336_2$ of the second subsystem as described above. In this way, non-position attributes are computed only for primitives not culled by HSR. In the second subsystem ($330_2$ and $334_2$), the position can either be computed again or read from the cache $336_1$ of the first subsystem.

Figure 12:
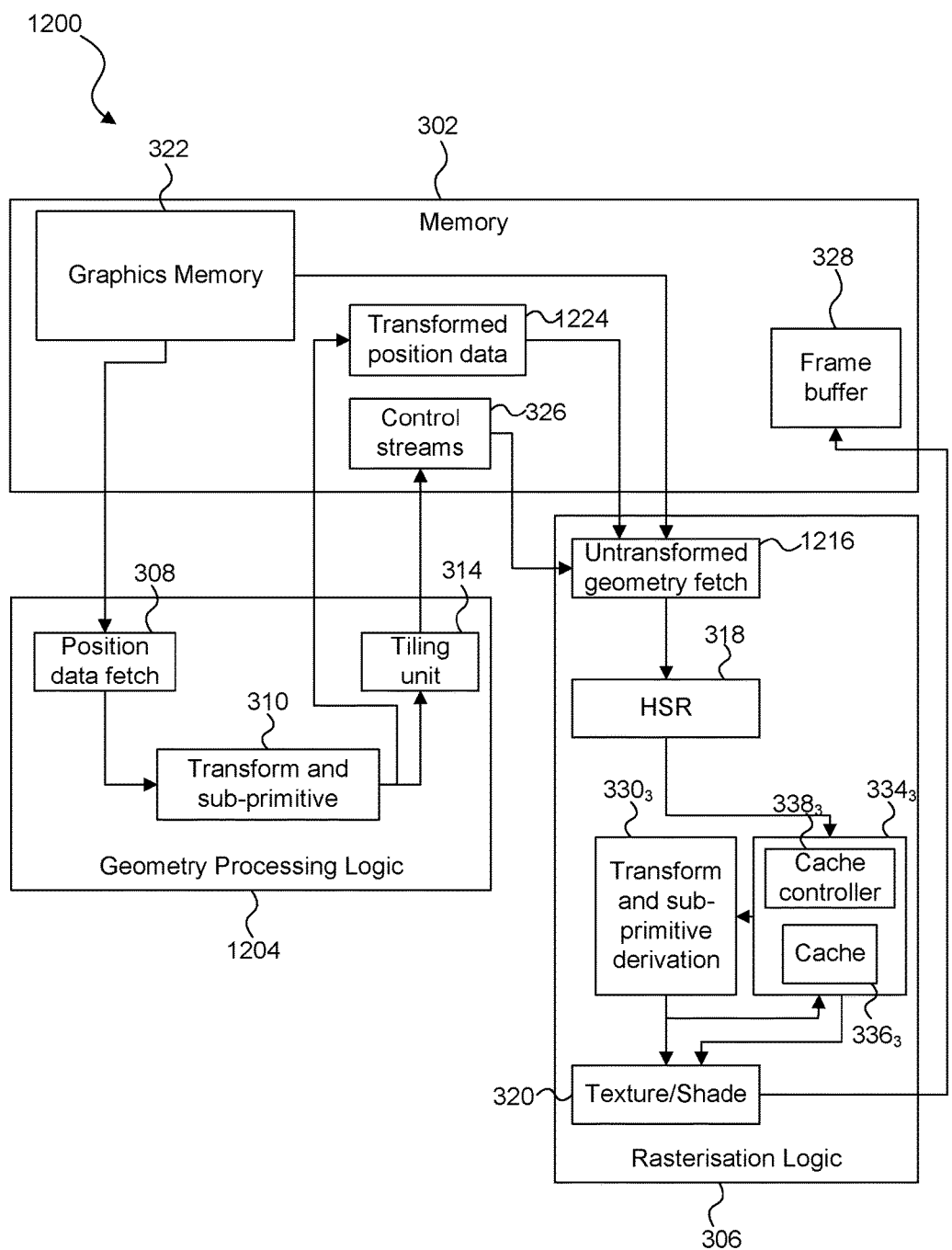
FIG. 12 shows a graphics processing system according to further alternative embodiments.

In further examples, e.g. in system 1200 as shown in FIG. 12, the transform and sub-primitive derivation logic $330_3$ and the cache system $334_3$ may be implemented after the HSR unit 318 but before the texturing/shading unit 320. In these examples, the geometry processing logic 1204 is similar to the geometry processing logic 304 but can send transformed position data for primitives and sub-primitives for storage in the memory 302 (e.g. in a transformed position buffer 1224) with the control streams. The fetch unit 1216 is similar to the fetch unit 316, but can fetch the transformed position data for primitives indicated as being in a particular tile by the control stream data for the particular tile. The HSR unit 318 can operate on the position data for performing hidden surface removal. The primitives output from the HSR unit 318 (i.e. on primitives not culled by HSR) are passed to the cache system $334_3$ which comprises a cache $336_3$ and a cache controller $338_3$ and which is configured to store non-position attributes of primitives which have been transformed. The cache system $334_3$ operates in a similar manner to the hierarchical cache system 334 described above and can retrieve transformed non-position attributes of primitives that are outputted from the HSR unit 318 and pass those retrieved attributes to the texturing/shading unit 320. If the transformed non-position attributes of primitives that are outputted from the HSR unit 318 are not stored in the cache $336_3$ then the transform and sub-primitive derivation logic $330_3$ derives the transformed non-position attributes of primitives and provides them to the texturing/shading unit 320 (and also to the cache system $334_3$ for storage in the cache $336_3$ for subsequent use). The transform and sub-primitive derivation logic $330_3$ may compute the position data for primitives or may use the position data fetched from the memory 302. The hierarchical cache system $334_3$ may operate according to the principles described above in relation to the cache system 334.

Figure 13:
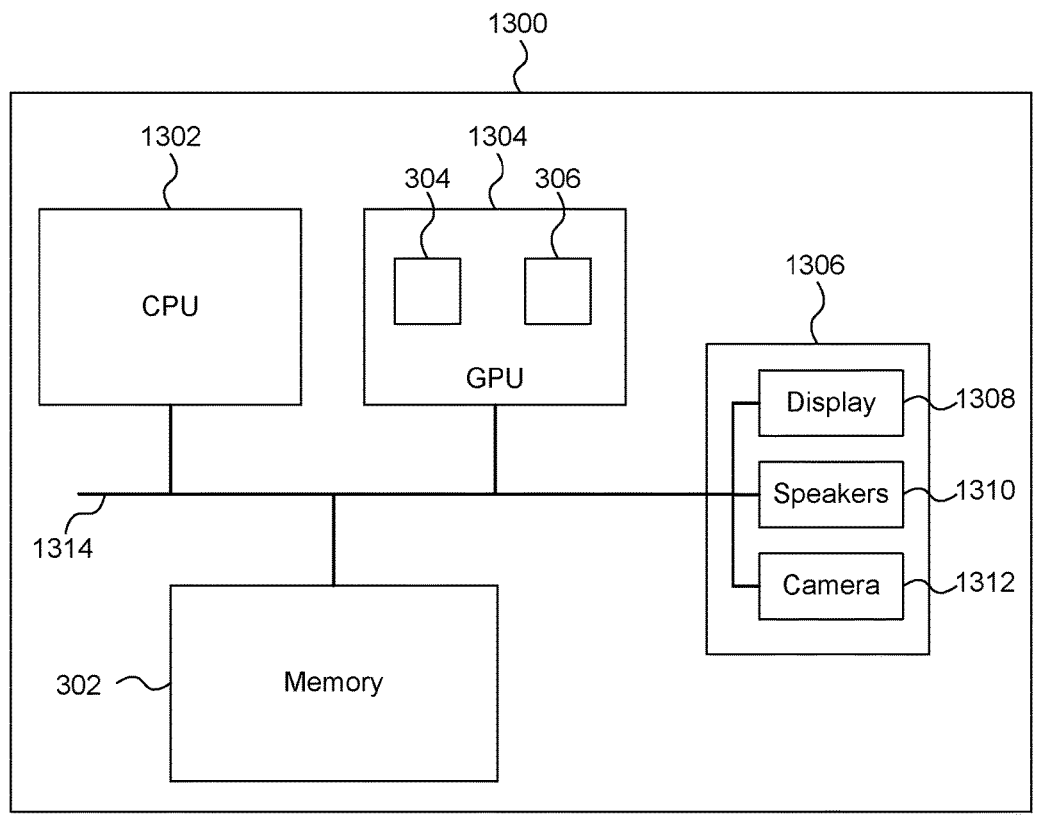
FIG. 13 shows a computer system in which a graphics processing system is implemented.

FIG. 13 shows a computer system in which the graphics processing system 300 may be implemented. The computer system comprises a CPU 1302, a GPU 1304, a memory 302 and other devices 1306, such as a display 1308, speakers 1310 and a camera 1312. The geometry processing logic 304 and the rasterisation logic 306 are implemented on the GPU 1304. In other examples, the geometry processing logic 304 and the rasterisation logic 306 may be implemented on the CPU 1302. The components of the computer system can communicate with each other via a communications bus 1314.

The systems described herein are shown in the figures as comprising a number of functional blocks. This is schematic only and is not intended to define a strict division between different logic elements of such entities. Each functional block may be provided in any suitable manner. It is to be understood that intermediate values described herein as being formed by a graphics processing system need not be physically generated by the graphics processing system at any point and may merely represent logical values which conveniently describe the processing performed by the graphics processing system between its input and output.

The graphics processing systems described herein may be embodied in hardware on an integrated circuit. The graphics processing systems described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed (i.e. run) in an integrated circuit manufacturing system configures the system to manufacture a graphics processing system configured to perform any of the methods described herein, or to manufacture a graphics processing system comprising any apparatus described herein. An integrated circuit definition dataset may be, for example, an integrated circuit description.

Therefore, there may be provided a method of manufacturing, at an integrated circuit manufacturing system, a graphics processing system as described herein. Furthermore, there may be provided an integrated circuit definition dataset that, when processed in an integrated circuit manufacturing system, causes the method of manufacturing a graphics processing system to be performed.

An integrated circuit definition dataset may be in the form of computer code, for example as a netlist, code for configuring a programmable chip, as a hardware description language defining an integrated circuit at any level, including as register transfer level (RTL) code, as high-level circuit representations such as Verilog or VHDL, and as low-level circuit representations such as OASIS® and GDSII. Higher level representations which logically define an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a graphics processing system will now be described with respect to FIG. 14.

Figure 14:
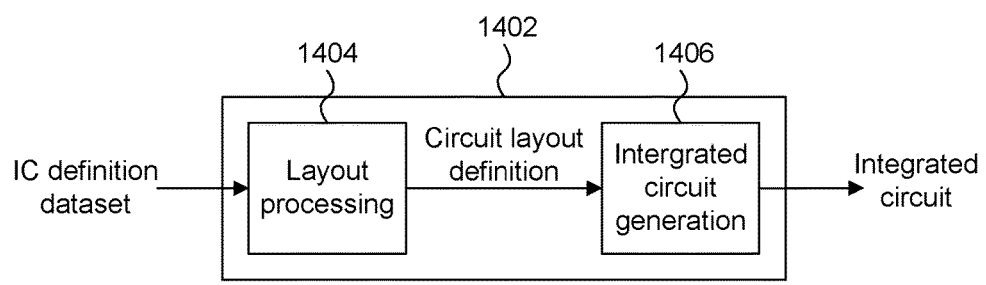
FIG. 14 shows an integrated circuit manufacturing system for generating an integrated circuit embodying a graphics processing system.

FIG. 14 shows an example of an integrated circuit (IC) manufacturing system 1402 which is configured to manufacture a graphics processing system as described in any of the examples herein. In particular, the IC manufacturing system 1402 comprises a layout processing system 1404 and an integrated circuit generation system 1406. The IC manufacturing system 1402 is configured to receive an IC definition dataset (e.g. defining a graphics processing system as described in any of the examples herein), process the IC definition dataset, and generate an IC according to the IC definition dataset (e.g. which embodies a graphics processing system as described in any of the examples herein). The processing of the IC definition dataset configures the IC manufacturing system 1402 to manufacture an integrated circuit embodying a graphics processing system as described in any of the examples herein.

The layout processing system 1404 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 1404 has determined the circuit layout it may output a circuit layout definition to the IC generation system 1406. A circuit layout definition may be, for example, a circuit layout description.

The IC generation system 1406 generates an IC according to the circuit layout definition, as is known in the art. For example, the IC generation system 1406 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 1406 may be in the form of computer-readable code which the IC generation system 1406 can use to form a suitable mask for use in generating an IC.

The different processes performed by the IC manufacturing system 1402 may be implemented all in one location, e.g. by one party. Alternatively, the IC manufacturing system 1402 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a graphics processing system without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 14 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 14, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

The invention claimed is:

1. A graphics processing system configured to use a rendering space which is subdivided into a plurality of tiles, the graphics processing system comprising:
  geometry processing logic comprising:
    geometry transform and sub-primitive logic configured to receive graphics data of input graphics data items, and to determine transformed positions within the rendering space of one or more sub-primitives derived from the input graphics data items; and a tiling unit configured to generate, for each of the tiles, control stream data including: (i) identifiers of input graphics data items which are to be used for rendering the tile, and (ii) sub-primitive indications to indicate which of the sub-primitives are to be used for rendering the tile, wherein one or more of the sub-primitive indications is a hierarchical index, wherein a hierarchical index for a particular sub-primitive indicates which of one or more graphics data items at each of one or more different levels of a hierarchy are for use in deriving the particular sub-primitive; and rasterisation logic configured to generate a rendering output for each of the tiles, the rasterisation logic comprising:

a fetch unit configured to fetch input graphics data items identified by the identifiers in the control stream data for a particular tile;

rasterisation transform and sub-primitive derivation logic configured to derive, from the fetched input graphics data items, transformed sub-primitives within the rendering space, wherein the derived sub-primitives are to be used for rendering the particular tile, and wherein the sub-primitives are derived in accordance with the sub-primitive indications in the control stream data for the particular tile, wherein the rasterisation transform and sub-primitive derivation logic is configured to use the hierarchical index for the particular sub-primitive to identify one or more graphics data items in the hierarchy to be used to derive the particular sub-primitive; and one or more processing units for rendering the derived sub-primitives, to thereby generate a rendering output for the particular tile.

2. The graphics processing system of claim 1 wherein at least some of the graphics data items are primitives.

3. The graphics processing system of claim 1 wherein some of the graphics data items are control points describing a patch to be tessellated to generate a plurality of tessellated primitives.

4. The graphics processing system of claim 1 wherein the sub-primitive indications in the control stream data for a tile indicate how to derive the sub-primitives to be used for rendering the tile from the input graphics data items.

5. The graphics processing system of claim 1 wherein the sub-primitive indications are represented as one or more masks.

6. The graphics processing system of claim 1 wherein the rasterisation logic further comprises:

a cache configured to store derived sub-primitives; and
a cache controller configured to:
receive the control stream data for a tile;
retrieve sub-primitives which are stored in the cache and which are indicated by the control stream data for the tile; and
provide the retrieved sub-primitives to the one or more processing units to be rendered.

7. The graphics processing system of claim 1 wherein the rasterisation transform and sub-primitive derivation logic is configured to determine one or more of the identified graphics data items of the hierarchy for use in deriving the particular sub-primitive.

8. The graphics processing system of claim 1 wherein each of the sub-primitives is derivable from one or more input graphics data items via a sequence of one or more processing stages, and wherein the hierarchy comprises one or more graphics data items representing results of processing stages of the sequence.

9. The graphics processing system of claim 8 wherein the sub-primitives are leaf nodes of the hierarchy.

10. The graphics processing system of claim 9 wherein the rasterisation transform and sub-primitive derivation logic is configured to derive the particular sub-primitive by selectively performing processes for deriving graphics data items, in accordance with the graphics data items identified by the hierarchical index for the particular sub-primitive.

11. The graphics processing system of claim 1 wherein the one or more processing units comprises:

a hidden surface removal unit configured to remove primitive fragments which are hidden; and
a texturing/shading unit configured to apply one or both of texturing and shading to primitive fragments.

12. The graphics processing system of claim 1 wherein the rasterisation logic further comprises a cache configured to store the derived sub-primitives for use by the one or more processing units for generating the rendering outputs for the tiles, and wherein vertices of each of the derived sub-primitives are stored in the cache with a hierarchical index which indicates a hierarchy of graphics data items used to derive the sub-primitive.

13. The graphics processing system of claim 1 wherein the graphics data of the input graphics data items which is received at the geometry transform logic is from a graphics memory, and wherein the fetch unit is configured to fetch input graphics data items from the graphics memory.

14. The graphics processing system of claim 1 wherein:

an input graphics data item is to be used for rendering a tile if, when transformed, the input graphics data item is at least partially in the tile; and
a sub-primitive is to be used for rendering a tile if the sub-primitive is at least partially in the tile.

15. A method of generating a rendering output in a graphics processing system configured to use a rendering space which is subdivided into a plurality of tiles, the method comprising a geometry processing phase and a rasterisation phase, wherein the geometry processing phase comprises:
receiving graphics data of input graphics data items;
determining transformed positions within the rendering space of one or more sub-primitives derived from the input graphics data items; and
for each of the tiles, generating control stream data including: (i) identifiers of input graphics data items which are to be used for rendering the tile, and (ii) sub-primitive indications to indicate which of the sub-primitives are to be used for rendering the tile, wherein one or more of the sub-primitive indications is a hierarchical index, wherein a hierarchical index for a particular sub-primitive indicates which of one or more graphics data items at each of one or more different levels of a hierarchy are for use in deriving the particular sub-primitive; and wherein the rasterisation phase comprises, for each of the tiles:
fetching input graphics data items identified by the identifiers in the control stream data for a particular tile;
using the fetched input graphics data items to derive transformed sub-primitives within the rendering space, wherein the derived sub-primitives are to be used for rendering the particular tile, and wherein the sub-primitives are derived in accordance with the sub-primitive indications in the control stream data for the particular tile, wherein said deriving the sub-primitives comprises using the hierarchical index for the particular sub-primitive to identify one or more graphics data items in the hierarchy to be used to derive the particular sub-primitive; and rendering the derived sub-primitives, to thereby generate a rendering output for the particular tile.

16. The method of claim 15 wherein said deriving the sub-primitives comprises deriving the sub-primitives from the input graphics data items by performing one or more of: (i) a transformation into the rendering space, (ii) clipping, (iii) geometry shading, and (iv) tessellation.

17. The method of claim 15 wherein an input graphics data item is to be used for rendering a tile if, when transformed, the input graphics data item is at least partially in the tile, and wherein a sub-primitive is to be used for rendering a tile if the sub-primitive is at least partially in the tile.

18. The method of claim 15 wherein:

the input graphics data items describe geometry within a 3D scene to be rendered, and wherein the rendering output is a rendered image of the scene; or the input graphics data items describe a texture, and wherein the rendering output image is used as texture in subsequent renders.

19. The method of claim 15 wherein the sub-primitive indications are represented as one or more masks.

20. A non-transitory computer readable storage medium having stored thereon computer readable code that when processed in an integrated circuit manufacturing system, causes the integrated circuit manufacturing system to manufacture a graphics processing system, wherein the graphics processing system is configured to use a rendering space which is subdivided into a plurality of tiles, the graphics processing system comprising:

geometry processing logic comprising:

geometry transform and sub-primitive logic configured to receive graphics data of input graphics data items, and to determine transformed positions within the rendering space of one or more sub-primitives derived from the input graphics data items; and a tiling unit configured to generate, for each of the tiles, control stream data including: (i) identifiers of input graphics data items which are to be used for rendering the tile, and (ii) sub-primitive indications to indicate which of the sub-primitives are to be used for rendering the tile, wherein one or more of the sub-primitive indications is a hierarchical index, wherein a hierarchical index for a particular sub-primitive indicates which of one or more graphics data items at each of one or more different levels of a hierarchy are for use in deriving the particular sub-primitive; and rasterisation logic configured to generate a rendering output for each of the tiles, the rasterisation logic comprising:

a fetch unit configured to fetch input graphics data items identified by the identifiers in the control stream data for a particular tile;

rasterisation transform and sub-primitive derivation logic configured to derive, from the fetched input graphics data items, transformed sub-primitives within the rendering space, wherein the derived sub-primitives are to be used for rendering the particular tile, and wherein the sub-primitives are derived in accordance with the sub-primitive indications in the control stream data for the particular tile, wherein the rasterisation transform and sub-primitive derivation logic is configured to use the hierarchical index for the particular sub-primitive to identify one or more graphics data items in the hierarchy to be used to derive the particular sub-primitive; and one or more processing units for rendering the derived sub-primitives, to thereby generate a rendering output for the particular tile.

* * * * *